United States Patent
Uchida et al.

(10) Patent No.: US 6,590,878 B1
(45) Date of Patent: Jul. 8, 2003

(54) MOBILE COMMUNICATION SYSTEM WITH SHARED TIME SLOTS AND FREQUENCY CHANNELS

(75) Inventors: Yoshinori Uchida, Tokyo (JP); Shinji Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/214,940
(22) PCT Filed: Jun. 16, 1997
(86) PCT No.: PCT/JP97/02067
§ 371 (c)(1),
(2), (4) Date: Jan. 15, 1999
(87) PCT Pub. No.: WO98/58503
PCT Pub. Date: Dec. 23, 1998
(51) Int. Cl.[7] .................................. H04J 13/00
(52) U.S. Cl. ................... 370/330; 370/342; 370/347
(58) Field of Search ................ 370/347, 465, 370/330, 431, 218, 334, 319, 320, 321, 337, 335, 342, 343, 345, 441, 442, 478, 479, 480, 458

(56) References Cited

U.S. PATENT DOCUMENTS

| | | | | |
|---|---|---|---|---|
| 5,285,443 A | | 2/1994 | Patsiokas et al. | |
| 5,511,068 A | * | 4/1996 | Sato | 370/335 |
| 5,708,969 A | * | 1/1998 | Kotzin et al. | 455/423 |
| 5,758,090 A | * | 5/1998 | Doner | 709/236 |
| 5,805,581 A | * | 9/1998 | Uchida et al. | 370/335 |
| 5,828,661 A | * | 10/1998 | Weaver, Jr. et al. | 370/331 |
| 5,862,132 A | * | 1/1999 | Blanchard et al. | 370/342 |
| 5,894,473 A | * | 4/1999 | Dent | 370/342 |
| 5,926,470 A | * | 7/1999 | Tiedemann, Jr. | 370/334 |
| 6,055,429 A | * | 4/2000 | Lynch | 455/445 |
| 6,061,337 A | * | 5/2000 | Light et al. | 370/331 |
| 6,160,801 A | * | 12/2000 | Uchida et al. | 370/337 |
| 6,192,055 B1 | * | 2/2001 | Rasanen | 370/465 |
| 6,212,405 B1 | * | 4/2001 | Jiang et al. | 455/561 |
| 6,219,347 B1 | * | 4/2001 | Uchida et al. | 370/347 |
| 6,240,077 B1 | * | 5/2001 | Vuong et al. | 370/330 |
| 6,240,098 B1 | * | 5/2001 | Thibault et al. | 370/431 |
| 6,275,475 B1 | * | 8/2001 | Emmons, Jr. | 370/276 |
| 6,437,743 B1 | * | 8/2002 | Mintz et al. | 342/463 |

FOREIGN PATENT DOCUMENTS

| | | |
|---|---|---|
| JP | 62-15941 | 1/1987 |
| JP | 63-35025 | 2/1988 |
| JP | 63-35026 | 2/1988 |
| JP | 8-23574 | 1/1996 |
| JP | 9-500512 | 1/1997 |

* cited by examiner

Primary Examiner—Hassan Kizou
Assistant Examiner—Dmitry Levitan
(74) Attorney, Agent, or Firm—Rothwell, Figg, Ernst & Manbeck

(57) ABSTRACT

In a mobile communication system and a WLL communication system sharing a frequency or a time slot including time-divided CDMA method and TDMA method, radio waves are divided into groups according to a magnitude of a transmitting power and each group is assigned to a different time slot. Further, a frame synchronization is established among the base stations based on the transmitted radio waves, and cellular communication systems and PCS systems each having different time slot length are performed under a same frame synchronization.

29 Claims, 29 Drawing Sheets

FIG.23

EXAMPLE OF MANAGEMENT OF TRANSMISSION POWER FOR BASE STATION BS1 STORED IN MEMORY OF MSC TYPE SETTING PROCESSOR

| SPEECH CHANNEL NUMBER | SUB-SCRIBER NUMBER | ZONE NUMBER OF MOBILE STATION | TIME SLOT NUMBER | FRE-QUENCY CHANNEL NUMBER | TRANS-MISSION TYPE | TDMA: SYNCHRO-NOUS WORD CDMA: CODE NUMBER | BASE STATION NUMBER: LEVEL OF RECEIVED ELECTRICAL FIELD | MOBILE STATION NUMBER: TRANS-MISSION POWER | MOBILE STATION NUMBER: LEVEL OF RECEIVED ELECTRICAL FIELD | BASE STATION NUMBER: TRANS-MISSION POWER |
|---|---|---|---|---|---|---|---|---|---|---|
| 1031 | 31M | 11 | 1 | 3 | CDMA | 64031 | BS1:1 | MS31:1 | MS31:1 | BS1:1 |
| 1033 | 33M | 12 | 2 | 3 | CDMA | 64032 | BS1:1 | MS33:2 | MS33:1 | BS1:2 |
| 1034 | 34M | 12 | 2 | 3 | CDMA | 64034 | BS1:1 | MS34:2 | MS34:1 | BS1:2 |
| 1035 | 35M | 13 | 3 | 3 | CDMA | 64035 | BS1:1 | MS35:3 | MS35:1 | BS1:3 |
| 1042 | 42W | 12 | 2 | 3 | CDMA | 64042 | BS1:1 | WS42:2 | WS42:1 | BS1:2 |
| 1046 | 46W | 13 | 3 | 3 | CDMA | 64046 | BS1:1 | WS46:3 | WS46:1 | BS1:3 |
| 1047 | 47W | 13 | 3 | 3 | CDMA | 64047 | BS1:1 | WS47:3 | WS47:1 | BS1:3 |

FOOTNOTE 1: LEVEL OF RECEIVING ELECTRICAL FIELD HAS FOLLOWING 4 STAGES
3: RECEIVING LEVEL IN MAXIMUM CLASS, 2: INTERMEDIATE RECEIVING LEVEL,
1: OPTIMUM RECEIVING LEVEL, 0: NONE
INTERMEDIATE VALUE, FOR EXAMPLE, VALUE 0.5 MEANS NEITHER OPTIMUM RECEIVING LEVEL NOR NO RECEIVING LEVEL

FOOTNOTE 2: LEVEL OF TRANSMITTING ELECTRICAL FIELD HAS FOLLOWING 4 STAGES
3: TRANSMITTING LEVEL IN MAXIMUM CLASS, 2: INTERMEDIATE TRANSMITTING LEVEL,
1: TRANSMISSION LEVEL IN MINIMUM CLASS, 0: NONE

FIG.24

EXAMPLE OF MANAGEMENT OF TRANSMISSION POWER FOR BASE STATION BS2 STORED IN MEMORY OF MSC TYPE SETTING PROCESSOR

| SPEECH CHANNEL NUMBER | SUB- SCRIBER NUMBER | ZONE NUMBER OF MOBILE STATION | TIME SLOT NUMBER | FRE- QUENCY CHANNEL NUMBER | TRANS- MISSION TYPE | TDMA: SYNCHRO- NOUS WORD CDMA: CODE NUMBER | BASE STATION NUMBER: LEVEL OF RECEIVED ELECTRICAL FIELD | MOBILE STATION NUMBER: TRANS- MISSION POWER | MOBILE STATION NUMBER: LEVEL OF RECEIVED ELECTRICAL FIELD | BASE STATION NUMBER: TRANS- MISSION POWER |
|---|---|---|---|---|---|---|---|---|---|---|
| 1032 | 32M | 22 | 2 | 3 | CDMA | 64032 | BS2:1 | MS32:2 | MS32:1 | BS2:2 |
| 1036 | 36M | 23 | 3 | 3 | CDMA | 64036 | BS2:1 | MS36:3 | MS36:1 | BS2:3 |
| 1037 | 37M | 23 | 0 | 3 | CDMA | 64037 | BS2:1 | MS37:3 | MS37:1 | BS2:3 |
| 1041 | 41W | 21 | 1 | 3 | CDMA | 64041 | BS2:1 | WS41:1 | WS41:1 | BS2:1 |
| 1043 | 43W | 22 | 2 | 3 | CDMA | 64043 | BS2:1 | WS43:2 | WS43:1 | BS2:2 |
| 1044 | 44W | 22 | 2 | 3 | CDMA | 64044 | BS2:1 | WS44:2 | WS44:1 | BS2:2 |
| 1045 | 45W | 23 | 3 | 3 | CDMA | 64045 | BS2:1 | WS45:3 | WS45:1 | BS2:3 |

FIG. 25 EXAMPLE OF MANAGEMENT OF TRANSMISSION POWER FOR BASE STATIONS BS1/BS2 STORED IN MEMORY OF MSC TYPE SETTING PROCESSOR

| SPEECH CHANNEL NUMBER | SUB-SCRIBER NUMBER | ZONE NUMBER OF MOBILE STATION | TIME SLOT NUMBER | FRE-QUENCY CHANNEL NUMBER | TRANS-MISSION TYPE | TDMA: SYNCHRO-NOUS WORD CDMA: CODE NUMBER | BASE STATION NUMBER: LEVEL OF RECEIVED ELECTRICAL FIELD | MOBILE STATION NUMBER: TRANS-MISSION POWER | MOBILE STATION NUMBER: LEVEL OF RECEIVED ELECTRICAL FIELD | BASE STATION NUMBER: TRANS-MISSION POWER |
|---|---|---|---|---|---|---|---|---|---|---|
| 1031 | 31M | 11 | 1 | 4 | TDMA | SyW1 | BS1:1 | MS31:1 | MS31:1 | BS1:1 |
| 1033 | 33M | 12 | 2 | 4 | TDMA | Syw1 | BS1:1 | MS33:2 | MS33:1 | BS1:2 |
| 1034 | 34M | 12 | 2 | 3 | CDMA | 64034 | BS1:1 | MS34:2 | MS34:1 | BS1:2 |
| 1035 | 35M | 13 | 3 | 4 | TDMA | SyW1 | BS1:1 | MS35:3 | MS35:1 | BS1:3 |
| 1042 | 42W | 12 | 2 | 3 | CDMA | 64042 | BS1:1 | WS42:2 | WS42:1 | BS1:2 |
| 1046 | 46W | 13 | 3 | 5 | TDMA | Syw1 | BS1:1 | WS46:3 | WS46:1 | BS1:3 |
| 1047 | 47W | 13 | 3 | 3 | CDMA | 64047 | BS1:1 | WS47:3 | WS47:1 | BS1:3 |
| 1044 | 44W | 22 | 2 | 5 | TDMA | SyW2 | BS2:1 | WS44:2 | WS44:1 | BS2:2 |
| 1037 | 37W | 23 | 0 | 4 | TDMA | SyW2 | BS2:1 | WS37:3 | MS37:1 | BS2:3 |

FOOTNOTE 1: LEVEL OF RECEIVING ELECTRICAL FIELD HAS FOLLOWING 4 STAGES
3: RECEIVING LEVEL IN MAXIMUM CLASS, 2: INTERMEDIATE RECEIVING LEVEL,
1: OPTIMUM RECEIVING LEVEL, 0: NONE
INTERMEDIATE VALUE, FOR EXAMPLE, 0.5 MEANS NEITHER OPTIMUM RECEIVING LEVEL NOR NO RECEIVING LEVEL

FOOTNOTE 2: LEVEL OF TRANSMITTING ELECTRICAL FIELD HAS FOLLOWING 4 STAGES
3: TRANSMITTING LEVEL IN MAXIMUM CLASS, 2: INTERMEDIATE TRANSMITTING LEVEL, 1: TRANSMISSION LEVEL IN MINIMUM CLASS, 0: NONE

FIG.26

EXAMPLE OF MANAGEMENT OF TRANSMISSION POWER FOR TIME SLOT 2 OF BASE STATIONS BS1/BS2 STORED IN MEMORY OF MSC TYPE SETTING PROCESSOR

| SPEECH CHANNEL NUMBER | SUB-SCRIBER NUMBER | ZONE NUMBER OF MOBILE STATION | TIME SLOT NUMBER | FRE-QUENCY CHANNEL NUMBER | TRANS-MISSION TYPE | TDMA: SYNCHRO-NOUS WORD CDMA: CODE NUMBER | BASE STATION NUMBER: LEVEL OF RECEIVED ELECTRICAL FIELD | MOBILE STATION NUMBER: TRANS-MISSION POWER | MOBILE STATION NUMBER: LEVEL OF RECEIVED ELECTRICAL FIELD | BASE STATION NUMBER: TRANS-MISSION POWER |
|---|---|---|---|---|---|---|---|---|---|---|
| 1033 | 33M | 12 | 2 | 4 | TDMA | Syw1 | BS1:3 | MS33:4 | MS33:1 | BS1:2 |
| 1034 | 34M | 12 | 2 | 3 | CDMA | 64034 | BS1:1 | MS34:2 | MS34:1 | BS1:2 |
| 1042 | 42W | 12 | 2 | 3 | CDMA | 64042 | BS1:1 | WS42:2 | WS42:1 | BS1:2 |
| 1044 | 44W | 22 | 2 | 5 | TDMA | SyW2 | BS1:0.5 | WS44:2 | WS44:1 | BS2:2 |

FOOTNOTE 1 : LEVEL OF RECEIVING ELECTRICAL FIELD HAS FOLLOWING 4 STAGES
3 : RECEIVING LEVEL IN MAXIMUM CLASS, 2 : INTERMEDIATE RECEIVING LEVEL,
1 : OPTIMUM RECEIVING LEVEL, 0 : NONE
INTERMEDIATE VALUE, FOR EXAMPLE, 0.5 MEANS NEITHER OPTIMUM RECEIVING LEVEL NOR NO RECEIVING LEVEL

FOOTNOTE 2 : LEVEL OF TRANSMITTING ELECTRICAL FIELD HAS FOLLOWING 4 STAGES
3 : TRANSMITTING LEVEL IN MAXIMUM CLASS, 2 : INTERMEDIATE TRANSMITTING LEVEL, 1 : TRANSMISSION LEVEL IN MINIMUM CLASS, 0 : NONE
VALUE 4 INDICATES STRONG LEVEL OF TRANSMISSION SIGNAL AS AN EXCEPTION

FIG.27

EXAMPLE OF MANAGEMENT OF TRANSMISSION POWER FOR TIME SLOT 2 OF BASE STATIONS BS1/BS2 STORED IN MEMORY OF MSC TYPE SETTING PROCESSOR

| SPEECH CHANNEL NUMBER | SUB-SCRIBER NUMBER | ZONE NUMBER OF MOBILE STATION | TIME SLOT NUMBER | FRE-QUENCY CHANNEL NUMBER | TRANS-MISSION TYPE | TDMA: SYNCHRO-NOUS WORD CDMA: CODE NUMBER | BASE STATION NUMBER: LEVEL OF RECEIVED ELECTRICAL FIELD | MOBILE STATION NUMBER: TRANS-MISSION POWER | MOBILE STATION NUMBER: LEVEL OF RECEIVED ELECTRICAL FIELD | BASE STATION NUMBER: TRANS-MISSION POWER |
|---|---|---|---|---|---|---|---|---|---|---|
| 1033 | 33M | 12 | 2 | 4 | TDMA | Syw1 | BS1:1 | MS33:2 | MS33:1 | BS1:2 |
| 1034 | 34M | 12 | 2 | 3 | CDMA | 64034 | BS1:1 | MS34:2 | MS34:1 | BS1:2 |
| 1042 | 42W | 12 | 2 | 3 | CDMA | 64042 | BS1:1 | WS42:2 | WS42:1 | BS1:2 |
| 1044 | 44W | 22 | 2 | 5 | TDMA | SyW2 | BS1:0.5 | WS44:2 | WS44:1 | BS2:2 |

FOOTNOTE 1 : LEVEL OF RECEIVING ELECTRICAL FIELD HAS FOLLOWING 4 STAGES
3 : RECEIVING LEVEL IN MAXIMUM CLASS, 2 : INTERMEDIATE RECEIVING LEVEL,
1 : OPTIMUM RECEIVING LEVEL, 0 : NONE
INTERMEDIATE VALUE, FOR EXAMPLE, 0.5 MEANS NEITHER OPTIMUM RECEIVING LEVEL NOR NO RECEIVING LEVEL

FOOTNOTE 2 : LEVEL OF TRANSMITTING ELECTRICAL FIELD HAS FOLLOWING 4 STAGES
3 : TRANSMITTING LEVEL IN MAXIMUM CLASS, 2 : INTERMEDIATE TRANSMITTING LEVEL, 1 : TRANSMISSION LEVEL IN MINIMUM CLASS, 0 : NONE
VALUE 4 INDICATES STRONG LEVEL OF TRANSMISSION SIGNAL AS AN EXCEPTION

FIG.28  EXAMPLE OF CONTROL CHANNELS FOR BASE STATION BS1 STORED IN MEMORY OF MSC TYPE SETTING PROCESSOR

| SPEECH CHANNEL NUMBER | SUB- SCRIBER NUMBER | ZONE NUMBER OF MOBILE STATION | TIME SLOT NUMBER | FRE- QUENCY CHANNEL NUMBER | TRANS- MISSION TYPE | TDMA: SYNCHRO- NOUS WORD CDMA: CODE NUMBER | BASE STATION NUMBER: LEVEL OF RECEIVED ELECTRICAL FIELD | MOBILE STATION NUMBER: TRANS- MISSION POWER | MOBILE STATION NUMBER: LEVEL OF RECEIVED ELECTRICAL FIELD | BASE STATION NUMBER: TRANS- MISSION POWER |
|---|---|---|---|---|---|---|---|---|---|---|
| 1060 | All | 11–13 | 0 | 3 | CDMA | 64060 | BS1:1 | — | — | BS1:3 |
| 1061 | All | 11–13 | 0 | 6 | TDMA | SyW1 | BS1:1 | — | — | BS1:3 |
| 1031 | 31M | 11 | 1 | 4 | TDMA | SyW1 | BS1:1 | MS31:1 | MS31:1 | BS1:1 |
| 1033 | 33M | 12 | 2 | 4 | TDMA | SyW1 | BS1:1 | MS33:2 | MS33:1 | BS1:2 |
| 1034 | 34M | 12 | 2 | 3 | CDMA | 64034 | BS1:1 | MS34:2 | MS34:1 | BS1:2 |
| 1035 | 35M | 13 | 3 | 4 | TDMA | SyW1 | BS1:1 | MS35:3 | MS35:1 | BS1:3 |
| 1042 | 42W | 12 | 2 | 3 | CDMA | 64042 | BS1:1 | WS42:2 | WS42:1 | BS1:2 |
| 1046 | 46W | 13 | 3 | 5 | TDMA | SyW1 | BS1:1 | WS46:3 | WS46:1 | BS1:3 |
| 1047 | 47W | 13 | 3 | 3 | CDMA | 64047 | BS1:1 | WS47:3 | WS47:1 | BS1:3 |

FOOTNOTE 1: LEVEL OF RECEIVING ELECTRICAL FIELD HAS FOLLOWING 4 STAGES
3: RECEIVING LEVEL IN MAXIMUM CLASS, 2: INTERMEDIATE RECEIVING LEVEL,
1: OPTIMUM RECEIVING LEVEL, 0: NONE
INTERMEDIATE VALUE, FOR EXAMPLE, 0.5 MEANS NEITHER OPTIMUM RECEIVING LEVEL NOR NO RECEIVING LEVEL

FOOTNOTE 2: LEVEL OF TRANSMITTING ELECTRICAL FIELD HAS FOLLOWING 4 STAGES
3: TRANSMITTING LEVEL IN MAXIMUM CLASS, 2: INTERMEDIATE TRANSMITTING LEVEL, 1: TRANSMISSION LEVEL IN MINIMUM CLASS, 0: NONE

FOOTNOTE 3: SPEECH CHANNELS 1060, 1061 ARE CONTROL CHANNELS, WHERE, CDMA USES AN EVEN NUMBER FRAME, TDMA USES AN ODD NUMBER FRAME

FIG.29

INFORMATION REGARDING TARGET BASE STATION ORDERS FOR FRAME SYNCHRONIZATION BY OPERATOR A STORED IN MEMORY OF MSC TYPE SETTING PROCESSOR

| NAME OF BASE STATION | ORDER OF TARGET FOR FRAME SYNCHRO-NIZATION | SYSTEM NAME | NAME OF BASE STATION | FRE-QUENCY CHANNEL NUMBER | TRANS-MISSION TYPE | TDMA: SYNCHRO-NOUS WORD CDMA: CODE NUMBER | OTHERS |
|---|---|---|---|---|---|---|---|
| BS74 | 1 | OPERATOR B | BS84 | f7 | TDMA | SyW4 | |
| | 2 | OPERATOR C | BS114 | f3 | CDMA | 640114 | |
| | 3 | OPERATOR D | BS124 | f8 | TDMA | SyW4 | |
| | 4 | OPERATOR A | BS75 | f6 | TDMA | SyW5 | |
| BS75 | 1 | OPERATOR B | BS85 | f7 | TDMA | SyW5 | |
| | 2 | OPERATOR C | BS115 | f3 | CDMA | 640115 | |
| | 3 | OPERATOR D | BS125 | f8 | TDMA | SyW5 | |
| | 4 | OPERATOR A | BS74 | f6 | TDMA | SyW4 | |
| BS76 | 1 | OPERATOR B | BS86 | f7 | TDMA | SyW6 | |
| | 2 | OPERATOR C | BS116 | f3 | CDMA | 640116 | |
| | 3 | OPERATOR D | BS126 | f8 | TDMA | SyW6 | |
| | 4 | OPERATOR A | BS75 | f6 | TDMA | SyW5 | |

FIG. 30 EXAMPLE OF INFORMATION OF TIME DELAY AMONG MOBILE STATION MS32 AND PERIPHERAL BASE STATIONS STORED IN MEMORY OF MSC TYPE SETTING PROCESSOR

| SPEECH CHANNEL NUMBER | SUB-SCRIBER NUMBER | ZONE NUMBER OF MOBILE STATION | TIME SLOT NUMBER | FRE-QUENCY CHANNEL NUMBER | TRANS-MISSION TYPE | TDMA: SYNCHRO-NOUS WORD CDMA: CODE NUMBER | BASE STATION NUMBER: LEVEL OF RECEIVED ELECTRICAL FIELD | MOBILE STATION NUMBER: TRANS-MISSION POWER | MOBILE STATION NUMBER: LEVEL OF RECEIVED ELECTRICAL FIELD | BASE STATION NUMBER: TRANS-MISSION POWER | BASE STATION NUMBER: DELAY TIME FROM BASE STATION |
|---|---|---|---|---|---|---|---|---|---|---|---|
| 1060 | All | 11–13 | 0 | 3 | CDMA | 64060 | BS1:1 | — | — | BS1:3 | — |
| 1061 | All | 11–13 | 0 | 6 | TDMA | SyW1 | BS1:1 | — | — | BS1:3 | — |
| 1070 | All | 21–23 | 0 | 3 | CDMA | 64070 | BS2:1 | — | — | BS2:3 | — |
| 1071 | All | 21–23 | 0 | 6 | TDMA | SyW2 | BS2:1 | — | — | BS2:3 | — |
| 1032 | 32M | 13 | 1 | 4 | TDMA | SyW1 | BS1:1 | MS32:3 | MS32:1 | BS1:3 | BS1:T4 |
| 1062 | 32M | 22 | 2 | 4 | TDMA | SyW2 | BS2:1 | MS32:2 | MS32:1 | BS2:2 | BS2:T6 |

FOOTNOTE 1 : LEVEL OF RECEIVING ELECTRICAL FIELD HAS FOLLOWING 4 STAGES
3 : RECEIVING LEVEL IN MAXIMUM CLASS, 2 : INTERMEDIATE RECEIVING LEVEL,
1 : OPTIMUM RECEIVING LEVEL, 0 : NONE
INTERMEDIATE VALUE, FOR EXAMPLE, 0.5 MEANS NEITHER OPTIMUM RECEIVING
LEVEL NOR NO RECEIVING LEVEL

FOOTNOTE 2 : LEVEL OF TRANSMITTING ELECTRICAL FIELD HAS FOLLOWING 4 STAGES
3 : TRANSMITTING LEVEL IN MAXIMUM CLASS, 2 : INTERMEDIATE TRANSMITTING
LEVEL, 1 : TRANSMISSION LEVEL IN MINIMUM CLASS, 0 : NONE

FOOTNOTE 3 : SPEECH CHANNELS 1060, 1061, 1070, 1071 ARE CONTROL CHANNELS, WHERE, CDMA
USES AN EVEN NUMBER FRAME, TDMA USES ODD NUMBER FRAME

FOOTNOTE 4 : IT IS SHOWN THAT MOBILE STATION MS32 ARE CONNECTING BOTH TWO
BASE STATIONS BS1 AND BS2, SIMULTANEOUSLY, IN DIFFERENT TIME SLOTS,
THROUGH TWO SPEECH CHANNELS (AN EXAMPLE OF HAND-OVER PROCESSING)

MOBILE COMMUNICATION SYSTEM WITH SHARED TIME SLOTS AND FREQUENCY CHANNELS

TECHNICAL FIELD

The present invention relates to a mobile communication system that is capable of realizing the use in combination of a wireless local loop (WLL) communication system and a mobile communication system using frequency channel sharing and time slot sharing based on a time-divided multiple access (TDMA) method, or a code division multiple access (CDMA) method, or a time-divided CDMA method.

BACKGROUND ART

A mobile communication system mainly comprises for example a mobile vehicle communication apparatus or mobile portable communication apparatus (hereinafter referred to as mobile stations) and base stations that communicate with the mobile stations through radio channels or wireless channels. In mobile communication systems, sometimes a radio frequency spectrum using different radio communication methods is shared between FDMA (frequency division multiple access)/TDMA method and a CDMA method. CDMA methods sharing frequencies between different codes have been performed. In the prior art, the technique in a mobile communication system with time slot sharing in which TDMA signals and time-divided CDMA signals are shared in a same time slot is known. In addition to this, there is a technique in mobile communication systems with time slot sharing, in which TDMA signals and time-divided CDMA signals are commonly used in a same time slot, and with frequency sharing. Furthermore, there is the conventional system that shares a plurality of CDMA signals disclosed in the United State patent U.S. Pat. No. 5,363,403, Spread Spectrum CDMA Subtractive Interference Canceller and Method, by D. L. Schilling et al. However, this US patent does not disclose any method handling time-divided CDMA signals.

In addition, in U.S. Pat. No. 5,511,068, Mobile Communication system capable of transmitting and receiving radio signals obtained by TDMA and CDMA methods without Interference, T. Sato discloses the Adaptive Filter in a time-divided CDMA signal system. However, in this literature, there is no description of frequency sharing of a time-divided CDMA signal and a TDIMA signal in a time slot.

Furthermore, the Japanese laid open publication number JP-A-6-268575 has disclosed a technique in which a receiving level of a radio signal transmitted from mobile stations to base stations is measured by a base station located in an uplink and the base station divides the received uplink signal into groups and each group is assigned into each time slot.

In addition, the Japanese laid open publication number JP-A-8-228375 discloses a technique to handle outer cells and inner cells in a concentric circle, but, there is no explanation about a technique to assign time-divided CDMA radio waves to different time slots inside and outside of a concentric circle zone of a mobile station or a Wireless Local Loop (WLL) station. In addition, in this literature, there is no description about interference in which a large power radio waves generate noise in small power radio waves in the demodulation of the CDMA method or about anti-interference.

As described above, in the prior art, in the conventional mobile communication systems formed; by WLL stations or mobile stations and base stations communicating them through radio wave channels, there is the requirement to expand time slot sharing and frequency channel sharing using different radio communication methods to WLL communication and mobile communication sharing systems performed between TDMA signals, time-divided CDMA signals, and synchronous word identification sharing TDMA signals.

Furthermore, the prior art entails the problem that it has been necessary to determine the function of the mobile switching station that manages the communication of the entire system in which different transmission power signals are assigned into different time slots when TDMA signals, time-divided CDMA signals, and synchronous word identification sharing TDMA signals are assigned into a mobile station positioned in a concentric-circle zone in a cell.

Moreover, the prior art entails the problem that operators in different mobile communication systems need to be able to perform a frame synchronization in each system described above.

The present invention is proposed to overcome the above drawbacks in the prior art. It is an object of the present invention to provide a mobile communication system enable TDMA signals or time-divided CDMA signals, and synchronous word identification sharing TDMA signals to perform time slot sharing and frequency sharing. mobile communication system is capable of avoiding the masking of TDMA signals, time-divided CDMA signals, and synchronous word identification TDMA signals by larger power transmission signals provided to mobile stations located in different zones. This is performed in a shared same time slot and frequency channel in which TDMA signals, time-divided CDMA signals, and synchronous word identification sharing TDMA signals are shared. For example, radio waves in a downlink transmitted from the base station are divided into different groups according to the magnitude of the radio wave transmission power. Each of the groups is assigned into a different time slot. It is thereby possible to obtain the mobile communication system that enables the shared use of frame synchronization of the same system by base stations belonging to a plurality of operators and capable of avoiding to mask the weak downlink and uplink radio waves.

DISCLOSURE OF THE INVENTION

According to the present invention, there is provided a mobile communication system comprising mobile stations of a plurality of mobile vehicle communication apparatus or mobile portable communications apparatus, semi-fixed WLL stations, at least one base station, and mobile switching centers connected to the base station. Radio communication among the above is performed based on FDMA or multi-carrier TDMA, or CDMA method, or time-divided CDMA method which are digital modulation methods such as FSK, BPSK, QPSK, QDPSK, p/4-DQPSK, QAMSK, QGMSK. The mobile communication system shares time slots and frequency channels having shared channels which are time-divided CDMA signal channels that share time slots and frequencies on a frequency axis with FDMA/TDMA digital signals. The TDMA signal on a same frequency channel and a same time slot comprises a plurality of signals, and the mobile stations, the WLL stations, the base stations identify each of the TDMA signals by setting a different synchronous word to each of the TDMA signals under the control of the mobile switching centers, and the radio communication is performed by using the time-divided CDMA signals that share the time slots and the frequencies with the TDMA signals or share the time slots with the TDMA signals.

This results in the effect that the time slot and frequency are shared in the TDMA signals and/or the time-divided CDMA signals and/or the synchronous word identification sharing TDMA signals. In addition, in the same time slot and frequency channels in which the TDMA signal, the time-divided CDMA signal, and the synchronous word identification sharing TDMA signal are shared, the masking of radio waves by radio waves of a large transmission power, transmitted to mobile stations located in different zones is avoided. It is thereby possible to reduce communication errors.

According to the present invention, there is provided a mobile communication system in which the mobile switching center comprises a memory. The mobile switching center identifies the WLL station belonging to the base station connected to the mobile switching center, stores radio information about the WLL station and relationship information about station identification information. The mobile switching center uses the relationship information of the WLL station stored in the memory when initiating communication to the WLL station.

According to the present invention, there is provided a mobile communication system in which when completing the radio communication with the WLL station, the mobile switching center updates the relationship information of the WLL station stored in the memory by using relationship information obtained during radio communication.

According to the present invention, there is provided a mobile communication system in which when starting a radio communication with the WLL station, the mobile switching center transmits the relationship information of the WLL station to the base station, the base station receives the relationship information of the WLL station, a transmitter incorporated in the base station controls a transmission power of a radio wave according to a position of the WLL station by using the received relation information of the WLL station, and transmits the radio wave of the controlled transmission power to the WLL station.

According to the present invention, there is provided a mobile communication system in which when starting a radio communication with the WLL station, the mobile switching center controls the transmission power of a radio wave transmitted from the base station connected to the WLL station according to a position of the WLL station by using the relationship information of the WLL station stored in the memory. A time slot is set corresponding to the transmission power of the radio wave.

According to the present invention, there is provided a mobile communication system in which a transmitter incorporated in each of the mobile stations, the WLL stations, and the base stations controls a transmission power of the TDMA signal, that shares a time slot and frequency channel with the time-divided CDMA signal, and the synchronous word identification sharing TDMA signal. Control is performed under the control of the mobile switching center.

According to the present invention, there is provided a mobile communication system in which the mobile switching center classifies the mobile stations and the WLL stations according to many kinds of magnitude of transmission powers of the TDMA signals and the synchronous word identification sharing TDMA signals that share time slots and frequency channels with time-divided CDMA signals, and assigns a different time slot to each classification. This results in an effect in that they are classified into groups according to transmission powers of the time-divided CDMA signal in downlink of the base station, and each group is assigned to different time slot.

According to the present invention, there is provided a mobile communication system in which the mobile switching center classifies the mobile stations and the WLL stations according to many kinds of magnitude of transmission powers of the TDMA signals, assigns a different time slot to each classification, sets a zone in one cell virtually for each classification, and locates the mobile stations and the WLL stations using the TDMA signals and the synchronous word identification signals sharing the time slots and the frequency channels with time-divided CDMA signals in the zone. Furthermore the mobile switching center stores allocation information about the mobile stations and the WLL stations in the memory for controlling.

According to the present invention, there is provided a mobile communication system comprising mobile stations of a plurality of mobile vehicle communication apparatus, semi-fixed WLL stations, at least one base station, and mobile switching centers connected to the base station. Radio communication among the above is performed based on FDMA or multi-carrier TDMA, or CDMA method, or time-divided CDMA method which are digital modulation methods such as FSK, BPSK, QPSK, QDPSK, p/4-DQPSK, QAMSK, QGMSK. The mobile communication system shares time slots and frequency channels having shared channels which are time-divided CDMA signal channels that share time slots and frequencies on a frequency axis with FDMA/TDMA digital signals. Otherwise in the mobile communication system, a plurality of time-divided CDMA signals and a plurality of TDMA signals share no frequency and share the same time slot. The mobile stations, the WLL stations, and the base stations in the mobile communication system have at least one time-divided CDMA control channel in the time-divided CDMA signal or at least one TDMA control signal in the TDMA signal under the control of the mobile switching center. The time-divided CDMA control channel handles control information of the time-divided CDMA method and control information of the TDMA method simultaneously The TDMA control channel handles the control information of the TDMA method and the control information of the time-divided CDMA method simultaneously.

According to the present invention, there is provided a mobile communication system in which the mobile station or the WLL station transmits and receives the control signal of the time-divided CDMA method and the control signal of the TDMA method and processes information relating the control signal of the time-divided CDMA method and information relating the control signal of the TDMA method simultaneously, and receives the TDMA control channel and the time-divided CDMA control channel under a receiving state of a broadcasting control channel. It selects one of the TDMA control channel and the time-divided CDMA control channel and transmits the control information to the base stations and the mobile switching centers by using the selected control channel. This enables use of the control information through a plurality of control channels among the mobile stations, the WLL stations, and the Base stations.

According to the present invention, there is provided a mobile communication system in which one of the base station and the mobile switching center or both the base station and the mobile switching center transmit and receive the control signal of the time-divided CDMA method and the control signal of the TDMA method and process information relating the control signal of the time-divided CDMA method and information relating the control signal of the TDMA method simultaneously. Otherwise one or both select one of processing of the information relating the control signal of the time-divided CDMA method and processing of the information relating the control signal of the TDMA method.

According to the present invention, there is provided a mobile communication system in which one of the base station and the mobile switching center or both the base station and the mobile switching center transmit and receive the control signal of the time-divided CDMA method and the control signal of the TDMA method and process information relating the control signal of the time-divided CDMA method and information relating the control signal of the TDMA method simultaneously. One or both broadcast information relating a traffic rate of the time-divided CDMA control channel and the TDMA control channel through a broadcasting control channel of the time-divided CDMA control channel and the TDMA control channel. The mobile station or the WLL station selects either the time divided CDMA control channel or the TDMA control channel.

According to the present invention, there is provided a mobile communication system in which one of the base station and the mobile switching center or both the base station and the mobile switching center transmit and receive the control signal of the time-divided CDMA method and the control signal of the TDMA method and process information relating the control signal of the time-divided CDMA method and information relating the control signal of the TDMA method simultaneously. One or both transmit and receive the time-divided CDMA control channel by using one of time frames, and transmit and receive the TDMA control channel by using a following time frame so that the time-divided CDMA control channel and the TDMA control channel are transmitted and received alternately per frame.

According to the present invention, there is provided a mobile communication system comprising a plurality of mobile stations, WLL stations, base stations, and mobile switching centers belonging to different operators. The plurality of mobile switching centers belonging to said all operators select either time slots and frequency channels in a TDMA method or a time-divided CDMA method when the TDMA method and the time-divided CDMA method share time slots forming frames on a time axis, and cells formed by radio waves transmitted by the plurality of base stations belonging to the all operators are overlapped. The mobile stations, the WLL stations, the base stations, and the mobile switching centers belonging to the different operators share information regarding a frame configuration of the time slot and frequency channels of the selected method.

According to the present invention, there is provided a mobile communication system in which each of the plurality of base stations transmits the TDMA control channel or the time-divided CDMA control channel. One base station belonging to one operator interrupts the transmission of the control channel in a time slot while transmitting notice information and so on to the mobile stations or to the WLL stations. That base station receives a control channel from the other base station belonging to the other operator during the interrupted time slot and synchronizes their own time frame with a time frame of the other base station belonging to the other operator.

According to the present invention, there is provided a mobile communication system in which when a base station belonging to an operator working as the standard of the time frame breaks down and interrupts the transmission of the control channel, the plurality of base stations select and use a control channel of the other base station belonging to the other operator as an alternative standard of the time frame.

According to the present invention, there is provided a mobile communication system in which when a base station belonging to an operator working as the standard of the frame breaks down and interrupts the transmission of the control channel, the plurality of base stations select and use a control channel of the other base station belonging to the other operator as an alternative standard of the time frame. The plurality of base stations and the mobile switching centers store the order of the other base stations to be the standard into a memory incorporated in each of the plurality of base stations and the mobile switching centers, and abandon the failed base station as the standard, and newly select the other base station as the standard for frame synchronization according to the order stored in the memory.

According to the present invention, there is provided a mobile communication system comprising mobile stations, WLL stations, a plurality of base stations, and mobile switching centers. Each of the plurality of base stations transmits a TDMA control channel or a time-divided CDMA control signal, and transmits notice information to the base stations or the WLL stations. The plurality of base stations have the function of synchronizing their own frame based on the synchronization information of a frame of other base station. The plurality of base stations may be located so that they do not directly receive radio waves transmitted from other base stations to each other. In this case, the mobile stations or the WLL stations, located at peripheral areas where cells formed by the radio waves transmitted from the plurality of base stations are overlapped, have the function of receiving a plurality of control channels transmitted from the plurality of base stations, measuring time differences among frame synchronization of the plurality of base stations, and transmitting information of the measured time difference to one of, or both of, or the plurality of base stations. The base stations synchronize their own frame with the frame of other base stations based on the transmitted information of the time difference about the frame synchronization. This enables efficient frame synchronization.

According to the present invention, there is provided a mobile communication system in which the plurality of base stations belong to different operator, respectively.

According to the present invention, there is provided a mobile communication system in which even if a WLL station is not calling, said WLL stations are capable of receiving a plurality of control channels transmitted from the plurality of base stations, of measuring the time difference among the frame synchronizations transmitted from the plurality of base stations, and of transmitting the measured information of the time difference to one of, or both of, or the plurality of base stations.

According to the present invention, there is provided a mobile communication system in which when there is no WLL station or no mobile station in the peripheral areas in which the cells formed by the radio waves from the plurality of base stations are overlapped, a supervision station is placed at a position where the radio waves from the plurality of base stations can be received. This supervision station measures the time difference among the frame synchronizations transmitted from the plurality of base stations, and transmits the measured information of the time difference to one of, or both of, or the plurality of base stations.

According to the present invention, there is provided a mobile communication system comprising mobile stations of a plurality of mobile vehicle communication apparatus or mobile portable communication apparatus, semi-fixed WLL stations, at least one base station, and mobile switching centers connected to the base station. Radio communication among the above is performed based on FDMA QGMSK or multi-carrier TDMA, or CDMA method, or time-divided CDMA method which are digital modulation methods such as FSK, BPSK, QPSK, QDPSK, p/4-DQPSK, QAMSK. The mobile communication system shares time slots and frequency channels having shared channels which are time-divided CDMA signal channels that share time slots and frequencies on a frequency axis with FDMA/TDMA digital signals. When mobile switching stations assign time-divided CDMA time slots to concentric zones in peripheral cells, zones in one cell to be assigned to the same time slot are assigned so as not overlap with the zones in the peripheral cells. Thereby, the zones and the time slots are combined properly and the masking of a transmission signal of a small power by a transmission signal of a large power is avoided.

According to the present invention, there is provided a mobile communication system comprising mobile stations of a plurality of mobile vehicle communication apparatus or portable communication apparatus, semi-fixed WLL stations, at least one base station, and mobile switching centers connected to the base station. Radio communication among the above is performed based on FDMA or multi-carrier TDMA, or CDMA method, or time-divided CDMA method which are digital modulation methods such as FSK, BPSK, QPSK, QDPSK, p/4-DQPSK, QAMSK, QGMSK. The mobile communication system shares time slots and frequency channels having shared channels which are time-divided CDMA signal channels that share time slots and frequencies on a frequency axis with FDMA/TDMA digital signals. The mobile stations, the WLL stations, and the base stations under instruction of the mobile switching stations control the sharing of cellular time-divided time slots and a PCS time-divided time slots in a same time-divided time slot so that a guard time of the cellular time-divided time slot is longer than a guard time of the PCS time-divided time slot. Thereby, the zones and the time slots are combined properly, masking a transmission signal of a small power by a transmission signal of a large power is avoided and the data communication is performed.

According to the present invention, there is provided a mobile communication system in which the cellular time-divided time slots is a cellular time-divided CDMA time slot, and the PCS time-divided time slot is a PCS time-divided CDMA time slot. The mobile stations, the WLL stations, and the base stations under instruction of the mobile switching stations control the sharing of the cellular time-divided CDMA time slot and the PCS time-divided CDMA time slot in the same time-divided time slot so that a guard time of the cellular time-divided CDMA time slot is longer than a guard time of the PCS time-divided CDMA time slot.

According to the present invention, there is provided a mobile communication system in which the cellular time-divided time slot is a cellular TDMA time slot, and the PCS time-divided time slot is a PCS TDMA time slot. The mobile stations, the WLL stations, and the base stations under instruction of the mobile switching stations control the sharing of the cellular TDMA time slot and the PCS TDMA time slot in the same time-divided time slot so that a guard time of the cellular TDMA time slot is longer than a guard time of the PCS TDMA time slot.

According to the present invention, there is provided a mobile communication system in which the cellular time-divided time slot is a cellular time-divided CDMA time slot and a cellular TDMA time slot, and the PCS time-divided time slot is a PCS time-divided CDMA time slot and a PCS TDMA time slot The mobile stations, the WLL stations, and the base stations under instruction of the mobile switching stations control the sharing of the cellular time-divided CDMA time slot and the cellular TDMA time slot and the PCS time-divided CDMA time slot and the PCS time-divided time slot in the same time-divided time slot so that a guard time of the cellular time-divided time slot is longer than a guard time of the PCS time-divided time slot.

According to the present invention, there is provided a mobile communication system comprising mobile stations of a plurality of mobile vehicle communication apparatus or mobile portable communication apparatus, semi-fixed WLL stations, at least one base station, and mobile switching centers connected to the base station. Radio communication among the above is performed based on FDMA or multi-carrier TDMA, or CDMA method, or time-divided CDMA method which are digital modulation methods such as FSK, BPSK, QPSK, QDPSK, p/4-DQPSK, QAMSK, QGMSK. The mobile communication system shares time slots and frequency channels having shared channels which are time-divided CDMA signal channels that share time slots and frequencies on a frequency axis with FDMA/TDMA digital signals. The mobile station uses TDMA signals or time-divided CDMA signals of different time slots in communication to the plurality of base stations The mobile station measures a transmitting time of radio-waves sent by the mobile station, prior to a time position of a head of the time slot according to time slot information obtained from one base station The mobile station then measures a time difference between a time of a head of a received radio wave from one base station and a time of a head of a received radio wave from the plurality of base stations, and the mobile switching centers store information regarding the measured time difference. When communicating with one base station, the mobile stations receive information regarding the time difference from the mobile switching centers and obtain the time information regarding the transmitting time that is a time prior to the head position of the time slot, at which the radio wave will be transmitted. Thereby, a proper time position of a time slot is always designated and controlled.

According to the present invention, there is provided a mobile communication system in which the information of the time difference is stored in a memory in each of the plurality of mobile switching centers. Thereby, the same information of time difference is shared among the plurality of mobile switching centers and a proper time position of a time slot is always designated and controlled.

BRIEF DESCRIPTION OF THE DRAWINGS

FIGS. 23 and 24 are diagrams showing information stored in a memory incorporated in a typesetting processor in the mobile switching center MSC, that is, examples such as speech channel numbers of time-divided CDMA signals that are time slotted, subscriber numbers, zone numbers, time slot numbers, and frequency channel numbers, as shown in FIGS. 2 and 3.

FIG. 25 is a diagram showing a management example of time slotted time-divided CDMA signals and TDMA signals stored in a memory incorporated in a type setting processor in the mobile switching center MSC.

FIG. 26 is a diagram showing a management example stored in a memory incorporated in a type setting processor in the mobile switching center MSC when no proper control of a TDMA signal transmission power shown in FIG. 6 is performed.

FIG. 27 is a diagram showing a management example stored in a memory incorporated in a type setting processor in the mobile switching center when optimal control of the transmission power shown in FIG. 7 is performed.

FIG. 28 is a diagram showing a management example of control channels to base stations where information is stored in a memory incorporated in a type setting processor in the mobile switching center.

FIG. 29 is a diagram showing an example of changed-orders of targets for frame synchronization stored in a memory incorporated in a type setting processor in the mobile switching center of the fifth embodiment.

FIG. 30 is a diagram showing the information of a delay time stored in a memory incorporated in the mobile switching center MSC.

BEST MODE FOR EMBODYING THE INVENTION

For a more detailed description of the present invention, a description will now be given of the best mode for practicing the present invention wit h reference to the accompanying drawings.

First Embodiment

Figure 1:
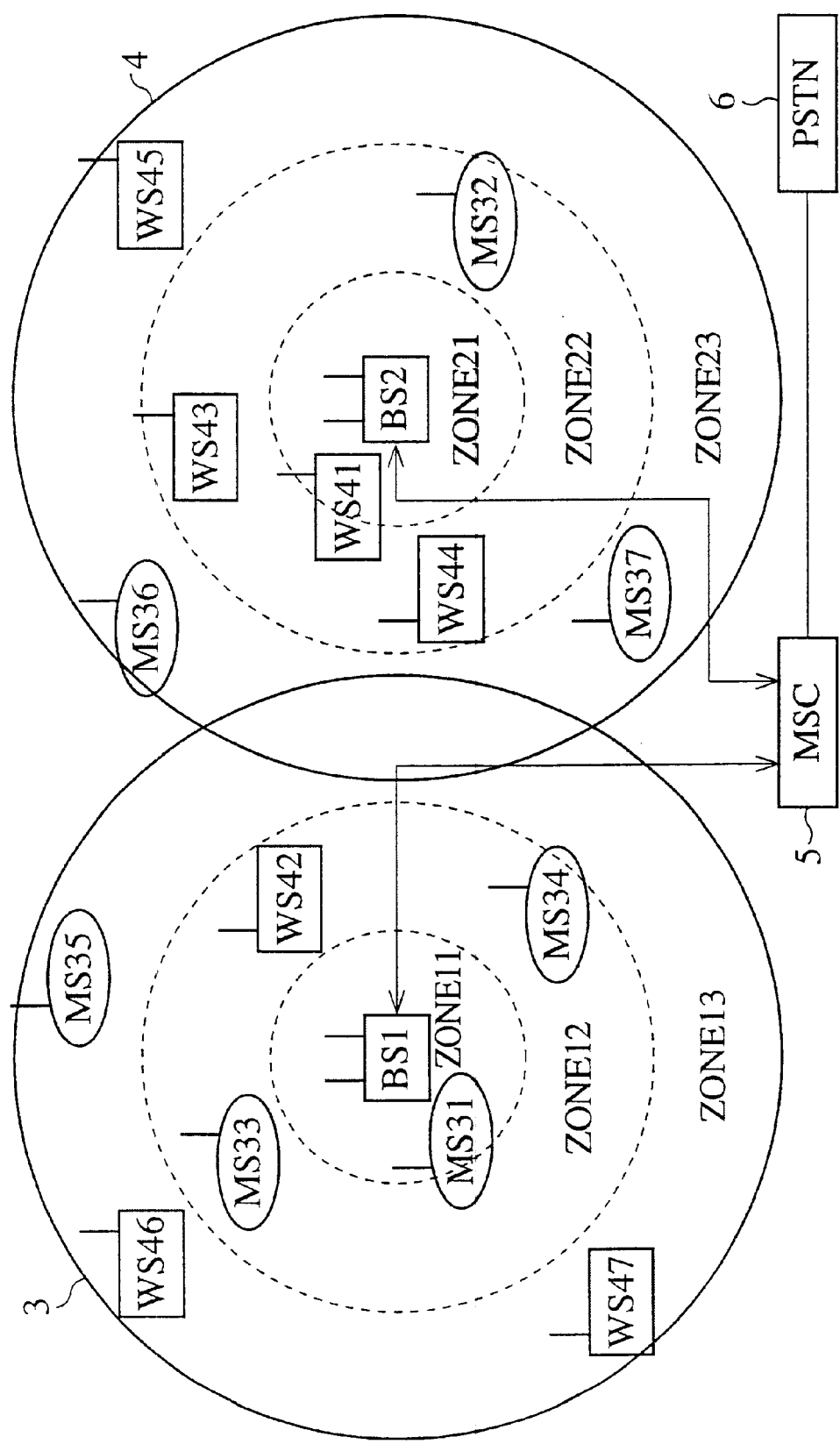
FIG. 1 is an explanation diagram showing the entire configuration of a mobile communication system of time slot sharing and frequency sharing according to the first embodiment of the present invention.

FIG. 1 is an explanation dia gram showing the entire configuration of a mobile communication system of time slot sharing and frequency sharing according to the first embodiment of the present invention. Specifically, FIG. 1 shows the configuration of cells in concentric circles. In the diagram, the reference characters BS1, BS2, designate radio wave base stations, the reference numbers 3 and 4 denote the covering area of radio waves and cells managed by the radio wave base stations BS1 and BS2. The cell 3 includes the zones 11, 12, and 13, and the cell 4 includes the zones 21, 22, and 23.

The mobile stations MS 31 to MS 37 are mobile stations such as mobile vehicle communication apparatus or mobile portable communication n apparatus which communicate with the base stations BS1 and B52 through radio wave channels. WS41 to WS47 denote semi-fixed Wireless Local Loop; (WLL) station s which communicate with the base stations BS1 and B52 through the radio wave channels. The reference number 5 designates a Mobile Switching Center (MSC), for controlling the operations of the base stations BS1 and BS2, connected to a Public Switching Telephone Network (PSTN).

Signals are transferred among the mobile stations MS31 to MS37, the WLL stations WS41 to WS47 and the base stations BS1 and BS2, based on digital modulation such as FSK, BPSK, QPSK, QDPSK, π/4-QDPSK, QAMSK, QGMSK, and the like. They are connected by radio waves based on Frequency Division Multiple Access (FDMA) method, Multi-carrier TDMA method, or Code Division Multiple Access (CDMA) method, or Time-divided CDMA method, or FDMA method, TDMA/FDD (Frequency Division Duplex) method, TDMA/TDD (Time-divided Duplex) method, CDMA/TDMA/FDD method, and CDMA/TDMA/TDD method.

As described above, the mobile communication system of the present invention comprises mainly a plurality of mobile stations MS, a plurality of WLL stations, a plurality of base stations BS, and a plurality of mobile switching centers MSC. Under the control of the mobile switching centers MSC, a plurality of mobile stations MS, a plurality of WLL stations, a plurality of base stations BS control and manage the transmission power and the time slot of time-divided CDMA signals and TDMA signals so that they have proper values.

Next, the operation of the invention will be explained.

Figure 2:
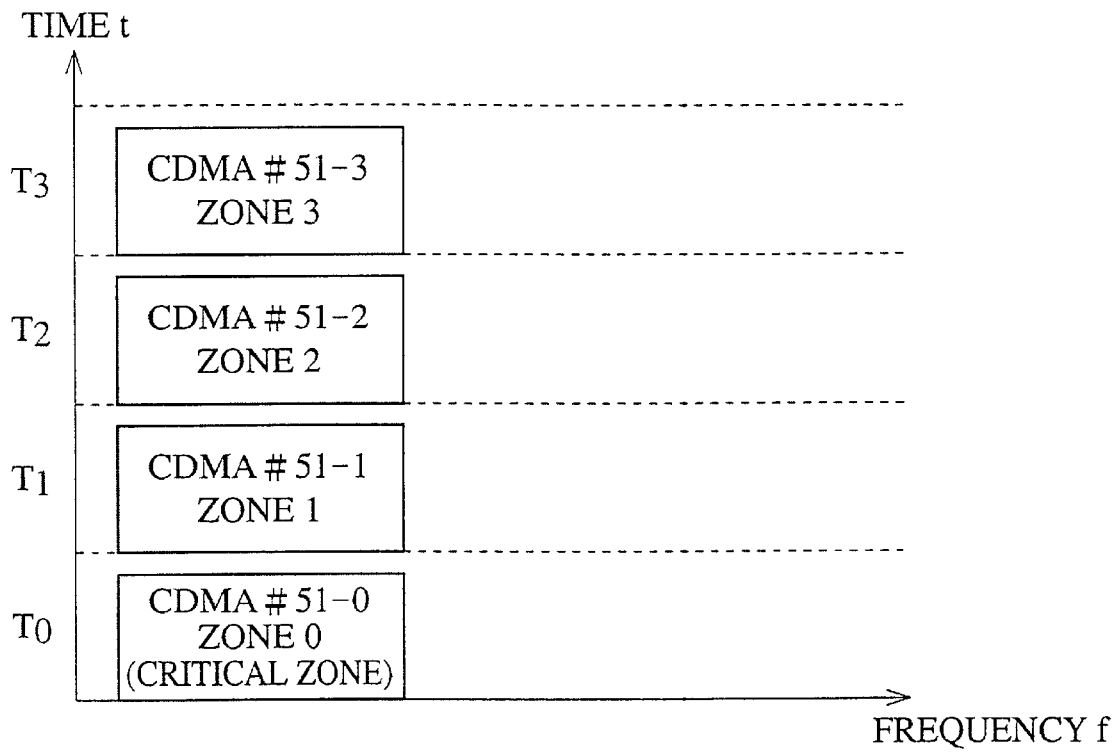
FIG. 2 is an explanation diagram showing an example of a frequency spectrum axis and a time axis when radio waves are used based on time-divided CDMA communication method.

FIG. 2 is an explanatory diagram showing an example of a frequency spectrum axis and a time axis when radio waves are used based on time-divided CDMA communication method. The figure shows an example in which the position of a time slot is changed according to the zone where the mobile station BS and the WLL station are present.

Accordingly, the power levels of transmission signals in a downlink transmitted by the base station BS, to a plurality of mobile station MS and/or a WLL station have approximately the same level when they are in the same time slot (namely, being present in the same zone). Conversely, the difference in power of transmission signals transmitted to mobile stations MS or WLL stations in a downlink increases among different time slots.

When there is a power difference between transmission signals, a transmission signal having a large power suppresses a transmission signal of a small power in a same time slot. Because transmission signals with different transmission power are set into different time slots, it is possible to avoid the situation that a transmission signal with a large transmission power suppresses a transmission signal with a small transmission power. Thereby, the drawbacks in a conventional time continuous type CDMA can be eliminated.

Figure 3:
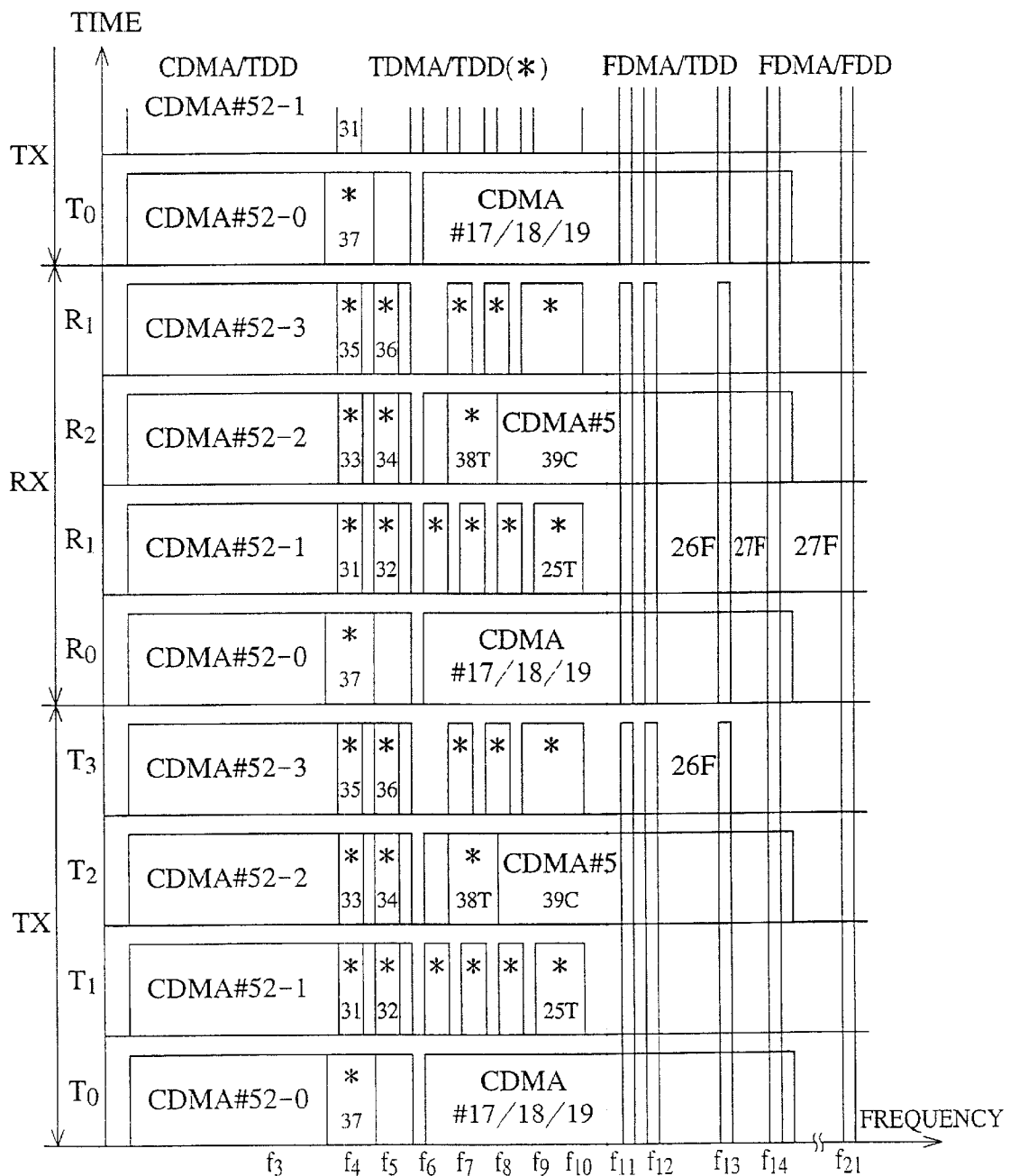
FIG. 3 is an explanation diagram showing a frequency sharing state of FDMA signals, TDMA signals, and the time-divided CDMA signals shown in FIG. 2 in an actual radio communication environment.

FIG. 3 is an explanatory diagram showing a frequency sharing state of FDMA/TDMA signals, TDMA signals and the time-divided CDMA signals shown in FIG. 2 in an actual radio communication environment.

As shown in FIG. 3, the relationships between frequencies and time slots in the shared mobile communication system with time-divided CDMA methods of time slots are shown by using frequency time slot regions CDMA#52-0, CDMA#52-1, CDMA#52-2, and CDMA#52-3 formed by the frequency f3 of the first time slot.

FIGS. 23 and 24 are tables showing examples such as speech channel numbers of time-divided CDMA signals that are time slotted, subscriber numbers, zone numbers, time slot numbers, and frequency channel numbers, as shown in FIGS. 2 and 3.

In FIGS. 23 and 24, although a subscriber number of an available mobile station or a WLL station has approximately 10 digits in general, a subscriber number of two digits is used in this explanation for brevity. In addition, the reference characters M and W are added after the last digit of each subscribe number in order to distinguish a mobile station from a WLL station, respectively.

Figure 4:
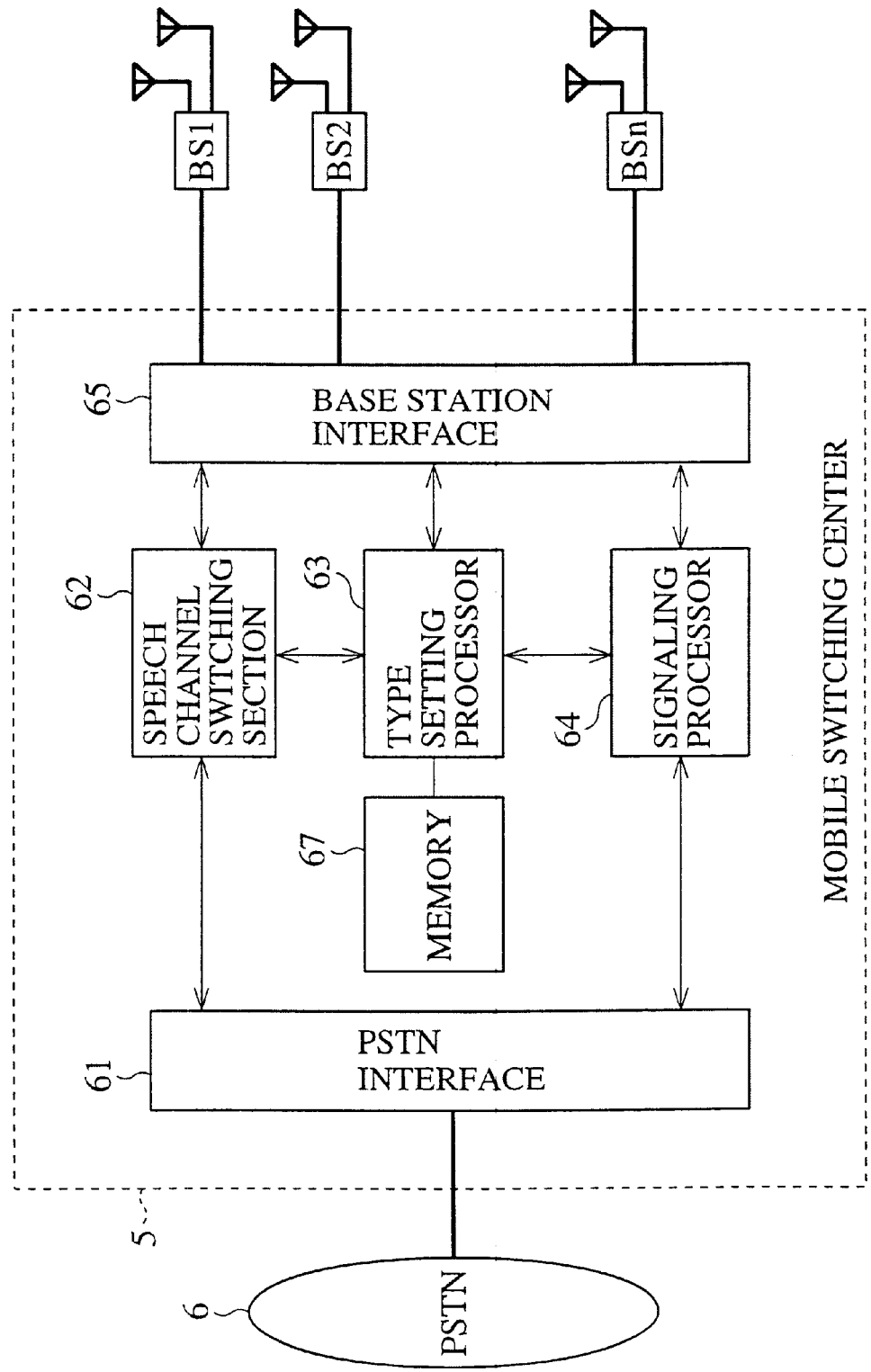
FIG. 4 is a block diagram showing the configuration of a mobile switching station in the mobile communication system of the first embodiment shown in FIG. 1.

FIG. 4 is a block diagram showing the configuration of a mobile switching center (MSC) as a configuration component of the mobile communication system of the first embodiment shown in FIG. 1. In the diagram, the reference number 61 designates a PSTN interface for connecting a Public Switching Telephone Network, 65 denotes a base station interface for connecting a plurality of base stations BS1, BS2, . . . , BSn, 62 indicates a speech channel switching section connected between the PSTN interface 61 and the base station interface 65, and 63 designate a type setting processor incorporating a memory 67 connected to the base station interface 65, the speech channel switching section 62, and a signaling processor 64, that will be explained later. The reference number 64 designates the signaling processor connected to the PSTN interface 61, the base station interface 65, and the type setting processor 63.

The memory 67 incorporated in the type setting processor 63 in the mobile switching center MSC, for example, stores information shown in FIGS. 23 and 24 that are managed by the type setting processor 63 and the information shown in FIGS. 25 to 30 used by the mobile communication systems of the second to ninth embodiments that will be explained later.

In the mobile communication system commonly used by the mobile station MS and the WLL station, for example, when the base station BS accesses the WLL station, the mobile switching center MSC transfers information about a magnitude of the transmission power or an assigned time slot, of the WLL station shown in FIGS. 23 and 24 which is stored in the memory 67 to the access target base station BS. The base station BS receives the transmitted information, and then transmits the radio wave to the WLL station according to the received information. Therefore there is the effect that it is possible to reduce the setting operation of communication parameters performed between the mobile switching center MSC and the WLL station by using the characteristics of a semi-fixed WLL station. As described above, because it is possible to reduce the setting operation of the communication parameters, to that degree the transmission of unnecessary radio waves can be eliminated. This avoids the transmission of radio waves causing interference. By this identification operation, the reference character W labeled at the last digit in the subscribe number is used as an identifier, as shown in FIGS. 23 and 24.

In actual cases of course, because the base station BS and the mobile switching center MSC can not know the present position of a mobile station MS the following operation must be performed in addition to the process described above.

That is, at first, the base station BS transmits a radio wave having the maximum power (the maximum power is transmitted based on the assuming that the mobile station MS is in the most outside zone). After this process, the mobile station transmits information about the level information of the transmitted radio wave to the base station BS. Thereby, the transmitter in the base station BS initiates the adjustment operation of the power level of the transmission radio wave for the mobile station MS. Similarly, the same adjustment process of the power of transmission radio wave to be transmitted to the base station BS described above will be performed for the first connection to the WLL station.

As described above, according to the first embodiment, the mobile switching center MSC stores various control information in the memory incorporated in the type setting processor 63. The mobile switching center MSC indicates a plurality of mobile stations MS, a plurality of WLL stations, and a plurality of base stations BS according to the stored control information, and then controls and manages the power level of TDMA signal, that is in the state of a time slot sharing and a frequency channel sharing, to a proper value. It is thereby possible to construct the mobile communication system with high performance, that is capable of performing the time slot sharing and the frequency channel sharing without generating communication errors.

Second Embodiment

Figure 5:
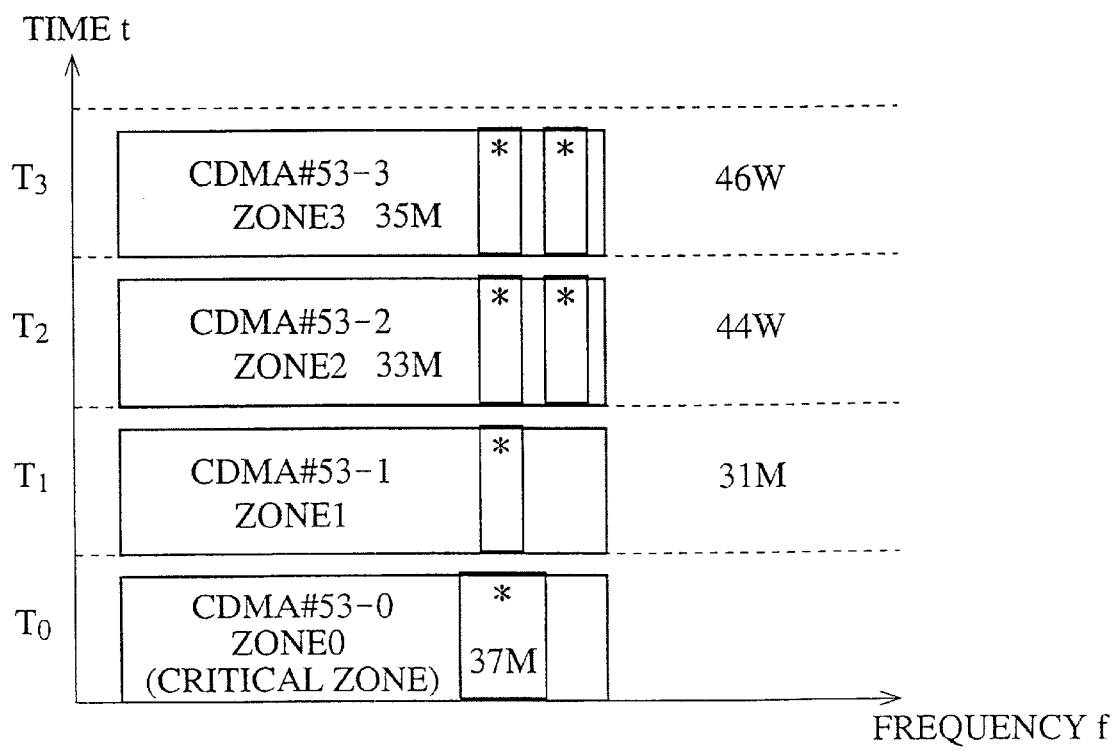
FIG. 5 is an explanation diagram showing a time axis and a frequency axis when a time slot and a frequency are shared by a time-divided CDMA signal and TDMA signals.

FIG. 5 is an explanation diagram showing a time axis and a frequency axis when time slots and frequencies are shared by time-divided CDMA signals and TDMA signals.

FIG. 25 is a table showing a management example about time slotted time-divided CDMA signals and TDMA signals, managed by the type setting processor 63 in the mobile switching center MSC. This information is stored in the memory 67 incorporated in the type setting processor 63 in the mobile switching center MSC, for example.

As shown in the mobile communication system of the first embodiment, FIG. 25 shows that the state of the transmission power is controlled per zone of the mobile station MS or the WLL station. When a time-divided CDMA signal of a large power and a time-divided CDMA signal of a small power are mixed, the former is evaluated as noise for the latter., The reliability or quality (a data error rate) of a low power time-divided CDMA signal is affected depending on the level of the high power time-divided CDMA signal.

In the prior art, there are many discussions regarding the control of a transmission power of time-divided CDMA signals as problems to be solved.

Next, the operation will now be explained.

Figure 6:
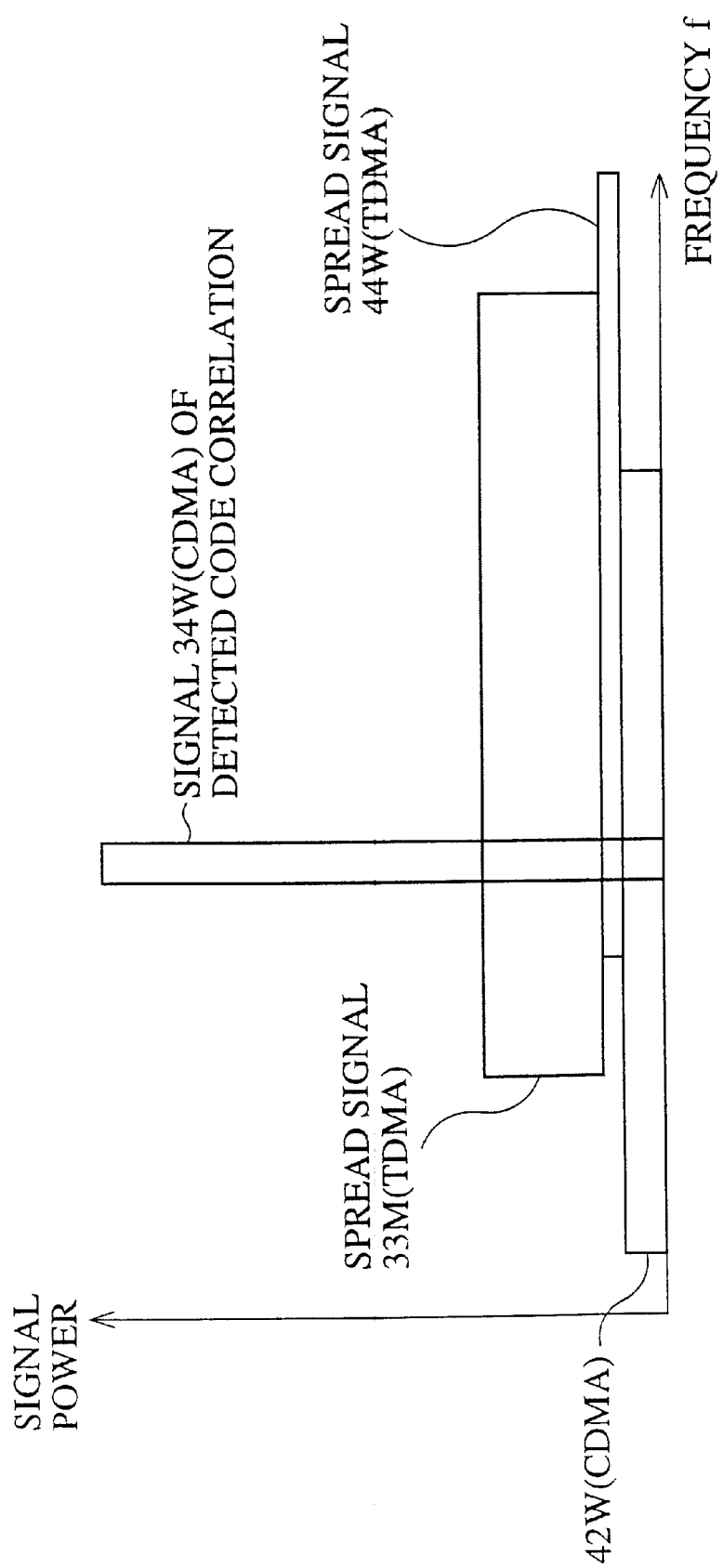
FIG. 6 is an explanation diagram showing a case in which no proper control of a TDMA signal transmission power is performed.

FIG. 6 is an explanatory diagram showing a case in which no proper control of a TDMA signal transmission power of the mobile station 33M is performed. FIG. 26 is a diagram showing a management example managed by the type setting processor 63 when no proper control of the transmission power of the mobile station 33M shown in FIG. 6 is performed.

As shown in FIG. 6, in the state where a time slot and frequency are shared by the TDMA signal and time-divided CDMA signal, the TDMA signal 33M of a large signal power is spread by using a spread code by a code correlator in a receiver for the time-divided CDMA signal, and then evaluated as noise, like un-required time-divided CDMA signals. Therefore the reliability or quality of the time-divided CDMA signal becomes low when the level of the spread TDMA signal as noise is large. That is, in the state that the TDMA signal and the time-divided CDMA signal share a time slot and a frequency channel, it must be required to reduce a TDMA signal power to a necessary and minimum power.

Figure 7:
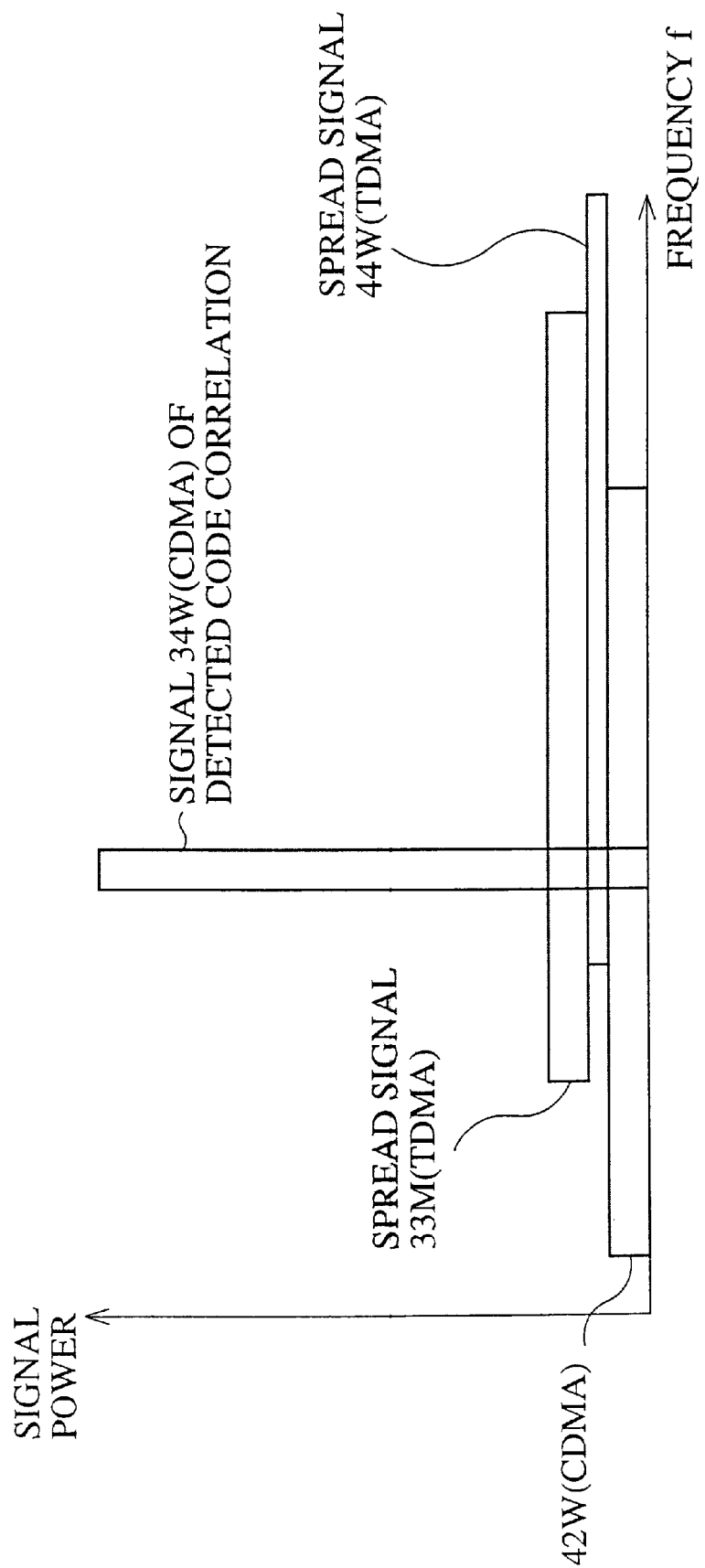
FIG. 7 is an explanation diagram showing a case in which a proper control of the TDMA signal transmission power is performed and showing an example in which optimal control of the transmission power is performed.

FIG. 7 is an explanation diagram showing a case in which a proper control of the TDMA signal transmission power is performed and showing an example in which the optimal control of the transmission power is performed. FIG. 27 is a diagram showing a management example controlled by the type setting processor 63 when, the optimal control of the transmission power shown in FIG. 7 is performed.

Next, the case that the optimize control of the transmission power is performed will be explained.

A receiver in the base station BS has the function for measuring Base station number: level of received electric field shown in FIG. 25. Thereby, the base station BS measures BS 1:3 as the received electrical field of the mobile station MS33, and then transfers the measured value to the mobile switching center MSC5. This measured value is stored in the memory 67 in the mobile switching center MSC5 (see the first line in FIG. 26). The type setting processor 63 in the mobile switching center MSC5 recognizes that the received electric field is 3, and then compares it with a received electric field 1 to be required, so that the type setting processor 63 judges that the measured value is much larger than a required level. The type setting processor 63 determines to reduce the transmission power to the base station BS1 from the mobile station MS33. This instruction to reduce the transmission power is transmitted from the type setting processor 63 in the mobile switching center MSC to the base station BS1 through the base station interface 65. The base station BS1 receives this instruction and then transmits this instruction to the mobile station MS33 through a control channel in the speech channel signal.

The transmitter (not shown) in the mobile station MS33 operates a transmission power control device (not shown) in the mobile station MS33 and reduces the transmission power based on the received instruction. Thereby, the base station BS1 receives the radio wave whose transmission power has been reduced from the mobile station MS33. The base station BS1 measures BS1:1 as a level of the received radio wave from the mobile station MS33 based on the measuring function of base station number: Level of Receiving electric field as shown in FIG. 26, and transmits the measured value to the mobile switching center MSCS. The mobile switching center MSC5 receives the measured value and the type setting processor 67 stores the received measured value BS1:1 in the memory 67 (see the first line in FIG. 27).

After this, the type setting processor 63 in the mobile switching center MSC recognizes that the received electric field is 1 and then judges that it has been reached to the required power level 1. The type setting processor 63 determines to maintain the transmission power from the mobile station MS33 to this value 1. Because the base station BS1 determines that the level 1 of the receiving electric field is a necessary and sufficient value, the mobile switching center MSC5 indicates and controls so that this value 1 is maintained in transmission power control devices incorporated in each of all the mobile stations MS and WLL stations. This is because the mobile switching center MSC5 has the function to indicate and to control it.

In addition, like the case of the WLL station using the time-divided CDMA method, firstly, the transmission power value shown in FIGS. 25 and 27 is used in order to eliminate the transmission power control process when the base station BS accesses the WLL stations 44W and 46W using the TDMA method as shown in FIGS. 25 and 27.

As described above, according to the second embodiment, the type setting processor 63 in the mobile switching center MSC controls the transmission power of the TDMA signal that shares a time slot and a frequency with the time-divided CDMA signal among the mobile stations and the WLL stations and the base stations BS. It is thereby possible to avoid the deterioration of the signal reliability or quality of the time-divided CDMA signal. Of course, it is not necessary to control the operation of the transmission power control for the TDMA signal not sharing a frequency with the CDMA signal. However, from the view point of increasing the operation time of a battery in the mobile station, the control operation of the transmission power is performed in order to reduce the transmission power to a necessary and minimum value. The explanation for this is omitted because the subject matter of the present invention differs from this.

Third Embodiment

Figure 8:
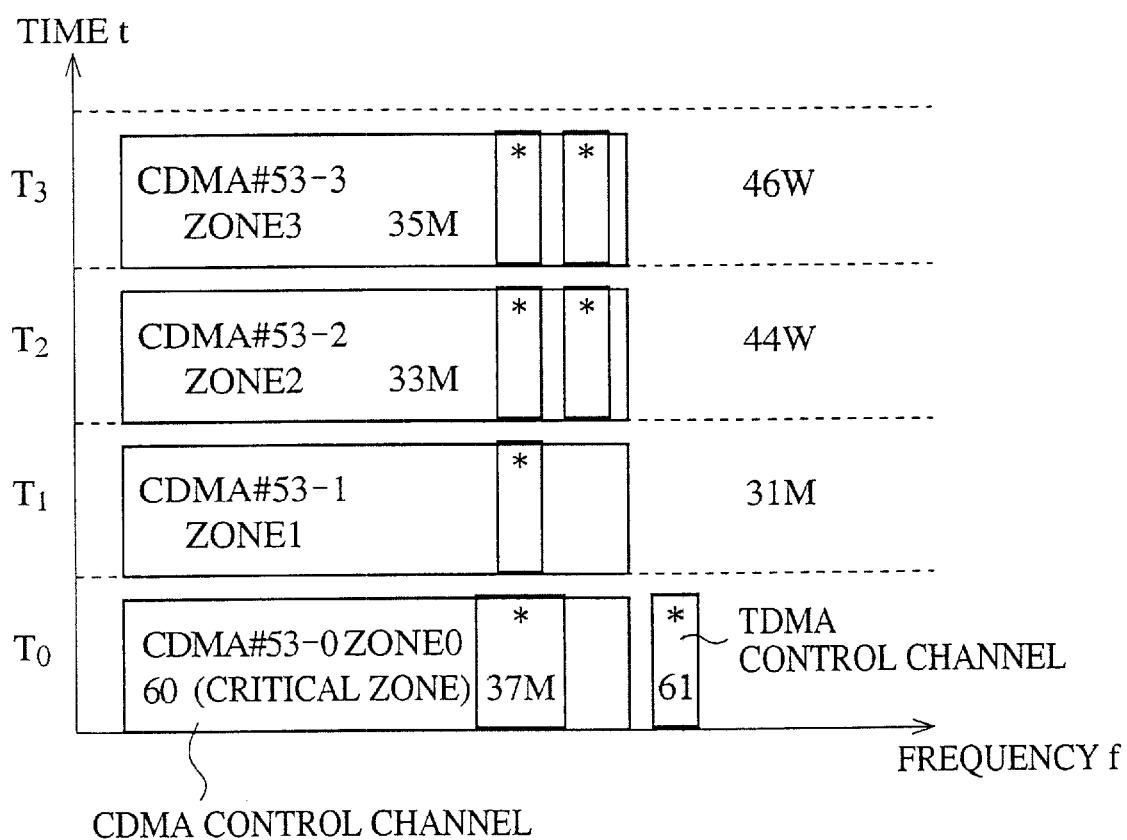
FIG. 8 is an explanation diagram showing time-divided CDMA signals/TDMA signals (designated by the reference character *) corresponding to zones and time-divided CDMA control channel 60/TDMA control channel 61 in the mobile communication system of the third embodiment according to the present invention.

FIG. 8 is an explanatory diagram showing time-divided CDMA signals/TDMA signals (designated by the reference character *) corresponding to zones and time-divided CDMA control channel 60/TDMA control channel 61 in the mobile communication system of the third embodiment according to, the present invention. In addition, FIG. 28 is a diagram showing a management example of control channels to base stations BS the information of which is stored in the memory 67 incorporated in the type setting processor 63 in the mobile switching center MSC5. In the diagram, 1060 and 1061 in the first and second lines designate a CDMA control channel and a TDMA control channel, respectively.

Next, the operation will now be explained.

When the mobile station MS or the WLL station starts the communication with the base station BS, at first, control information is transferred among the mobile station MS and the base station BS through a control channel. In the communication system using only one communication method (for example, in the communication system using only TDMA method or only CDMA method), one of the speech channels is used as the control channel. Conversely, the mobile communication system of the third embodiment uses TDMA method, time-divided CDMA method, and synchronous word identification sharing TDMA signal simultaneously. That is, the mobile communication system of the third embodiment is based on the communication method using a plurality of control channels.

There are the following four control channels (1) to (4) in the communication method used by the mobile communication system according to the third embodiment. Specifically, in the use of the following control channels, the,type setting processor 63 in the mobile switching center MSC indicates instructions to each of the mobile stations MS, the WLL stations, and the base stations BS based on the information stored in the memory 67, based on the information shown in FIG. 28, for example. Then, each of the mobile stations MS, the WLL stations, and the base stations BS uses the control channel according to this instruction.

(1) The communication method in which one speech channel in TDMA signal is assigned to the control channel. The mobile station MS of the time-divided CDMA method, the mobile station MS of the synchronous word identification sharing TDMA method in addition to the mobile station MS of the TDMA method use a TDMA signal having the control channel when communication is initiated. In this communication method, it is assumed that the mobile station is capable of functioning based on the TDMA method. Of course, because the mobile station MS capable of using the synchronous word sharing TDMA signal can also receive TDMA signals, this mobile station can also be used in the mobile communication system of the third embodiment.

(2) The communication method using a TDMA signal and a time-divided CDMA signal as a control channel simultaneously. In this case, because it is possible to initiate communication by using the control channel in either method, the mobile station MS or the WLL station selects the channel that is accessed by the station itself. In addition, a traffic state of each channel is broadcasted by using the broadcasting channel (BCCH) in the control channel. Thereby, the mobile station BS and the WLL station capable using either control channel selects the control channel having a lower traffic.

(3) The communication method in which the TDMA control channel 61 and the CDMA control channel 60 are alternately transmitted. That is, it is set so that the TDMA control channel is transferred/received by using an odd number frame and the CDMA control channel is transferred/ received by using an even number frame. In this case, it is possible to judge the odd number frame and the even number frame based on the type of the control channel. This is used as the standard when a half-rate speech codec is used.

(4) The communication method in which two TDMA control channels 61 are transmitted continuously, after this, two CDMA control channels 60 are also transmitted continuously. It is thereby possible to identify frames four times. This can be applied to a quarter speech codec (a transmission speed of quarter multiples of a full rate speech codec).

As described above, according to the third embodiment, the type setting processor in the mobile switching center MSC transfers instructions to each of the mobile stations MS, the WLL stations, and the base stations BS based on the information stored in the memory. Each of the mobile stations MS, the WLL stations, and the base stations BS uses the control channel according to the instructions. Even if the TDMA method, the time-divided CDMA method, and the synchronous word identification sharing TDMA signal are used simultaneously, a plurality of control channels and several types of control information can be transferred among the mobile stations MS, the WLL stations, and the base stations BS. It is thereby possible to perform Communication efficiently

Fourth Embodiment

Figure 9:
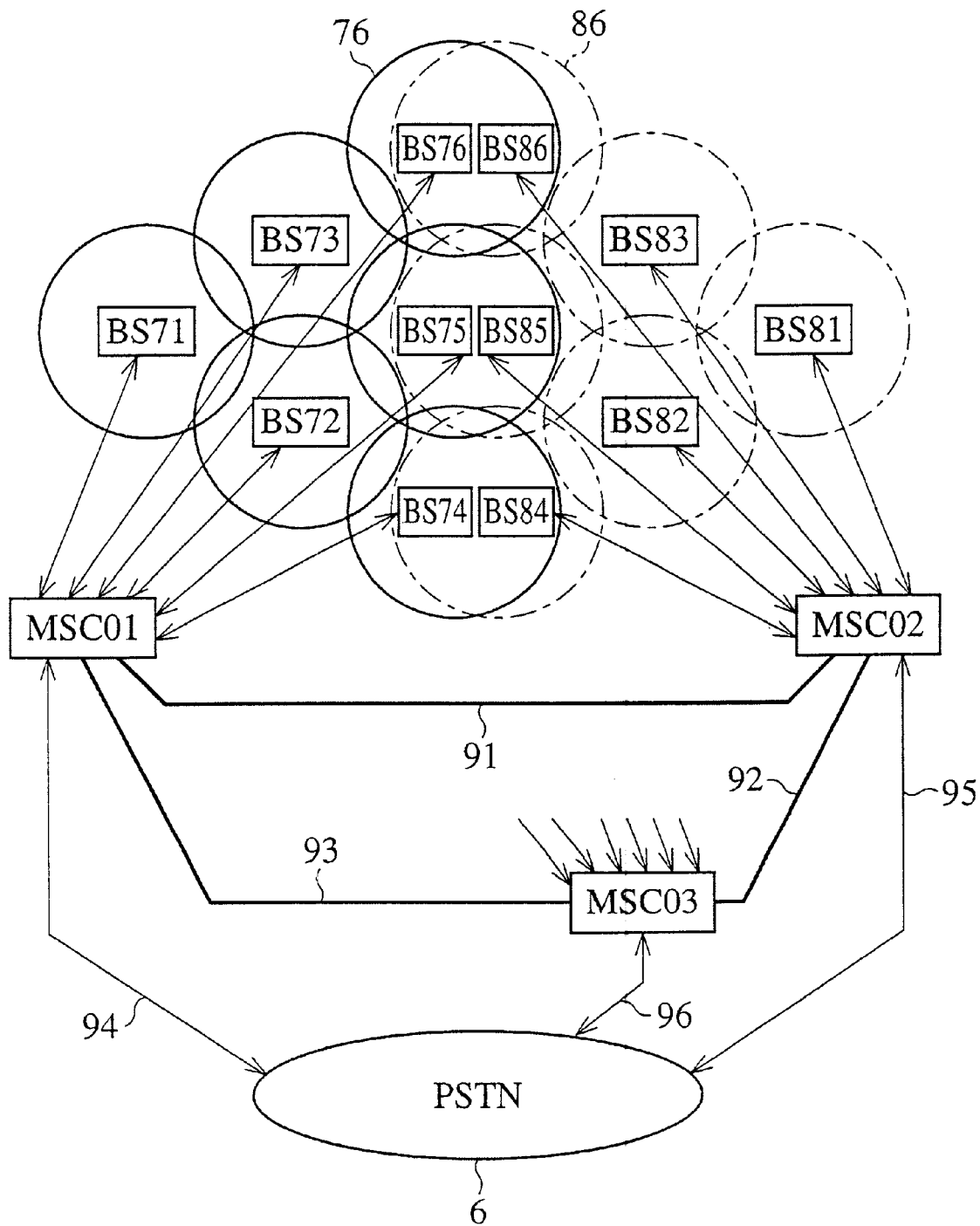
FIG. 9 is an explanation diagram showing the entire configuration of the mobile communication system of time slot sharing and frequency sharing of the fourth embodiment according to the present invention.

FIG. 9 is an explanation diagram showing the entire configuration of the mobile communication system of time slot sharing and frequency sharing of the fourth embodiment according to the present invention. In the diagram, the reference characters MSC01 and MSC02 designate mobile switching centers belonging to different operators and connected to the public switching telephone network PSTN 6. In addition, the reference characters BS71 to 75 and BS81 to 86 denote base stations.

The mobile switching center MSC01 belonging to the first operator has the cell 76. In the cell 76, the base station 76 is placed and the base station 76 is connected to the mobile switching center MSC01.

The mobile switching center MSC02 has the cell 86. The base station BS86 is placed in the cell 86. The base station BS86 is connected to the mobile switching center MSC02.

In the mobile communication system of the fourth embodiment, cells belonging to different operators is not only the connected to each other, but also parts of them are overlapped. Furthermore, there is a case that the entire of the cells are almost overlapped to each other.

In this case, there is a case that base stations BS belonging to different operators are placed close. When the areas to which the base stations BS belonging to the different operators transmit radio waves are overlapped, and if the frame configurations on time axis in the TDMA communication system and the time-divided CDMA sharing communication system, as shown in other embodiments of the present invention shown in FIG. 2, FIG. 3, FIG. 5, and FIG. 8, become different per operator, the time frame will be destroyed and it is thereby not possible to use the function of the time-divided multiple access communication system. That is, the base stations belonging to different operators share the time-divided frame structure to each other, as shown in FIG. 2.

Next, the operation will now be explained.

Figure 10:
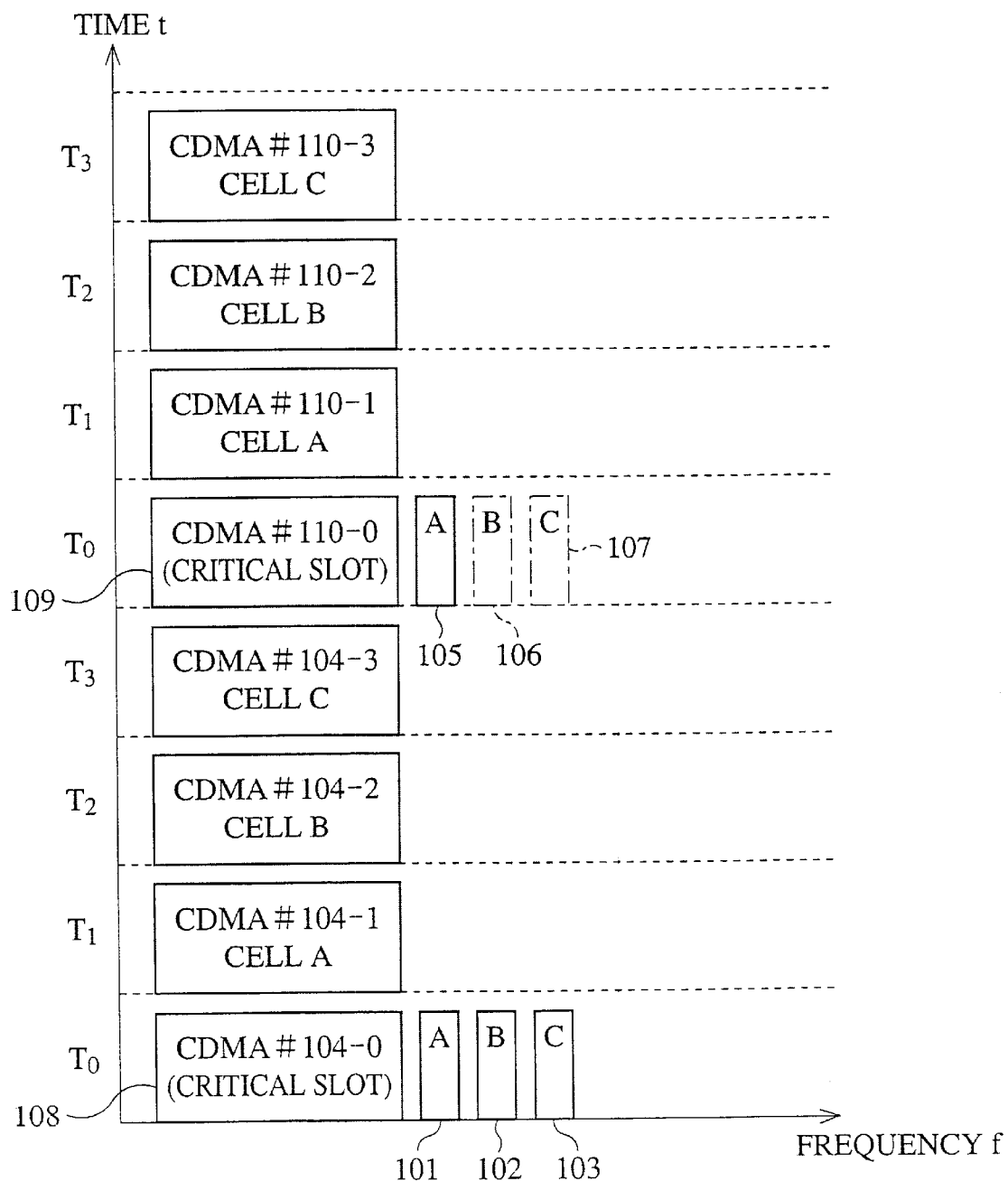
FIG. 10 is an explanation diagram showing an example in which a plurality of different operators share a configuration of same time slots and frequency channels.

FIG. 10 is an explanation diagram showing an example in which the communication systems belonging to a plurality of different operators share the configuration of same time slots and frequency channels.

The time slots 101, 102, and 103 shown in FIG. 10 designate control channels belonging to different operators. The two base stations B and C, using the time slots 106 and 107 indicated by alternate long and short dash lines, receive a radio wave of the control channel 105 (is the same as the time slots 106 and 107) of the base station A (for example, BS75 shown in FIG. 9). Those time slots indicate that the base station B (for example, the base station BS85 shown in FIG. 9) and the base station C (not shown) transmit no radio waves.

By using the configuration of the above control channels used in the mobile communication system of the fourth embodiment, the base stations B and C receive the control channel of the base station A, so that they recognize that the head position of the control channel is the head position of the frame. Thereby, a plurality of the base stations A, B, and C share the time axis frame shown in FIG. 10.

In addition, when a plurality of base stations belonging to a plurality of operators set the control channel into the time slot CDMA#104-0 of the time-divided CDMA signal, only the base station A uses the time slot CDMA#110-0 in transmitting and other base stations B and C belonging to other operators do not transmit in this time slot. It is thereby possible to commonly share the configuration of the time slots on the time axis as shown in FIG. 10.

Information (notification information about control channels) regarding control channels for the base stations BS belonging to other operators are given to each of the base stations B and C by each of the mobile switching centers MSC02 and MSC03, respectively. This information is stored in the memory in each of the base stations B and C. Thereby, each of the mobile switching centers MSC01, MSC02, and MSC03 can share the information of the base stations belonging to other operators to each other.

In addition, if the base station BS belonging to one operator as the standard is preset, it is possible to avoid confusion caused by a base station placed later on the time axis frame of one base station BS being frame synchronized. Furthermore, if the base station acting as the standard breaks down, it is possible to set the base station BS, that has been placed after the failed base station, as the standard.

FIG. 10 further shows an example that a time slot is assigned to each different operator. For example, when the traffic amount of a time slot is greatly increased, it is possible to use a temporary time slot CDMA#104-0 or CDMA#110-0.

As described above, according to the fourth embodiment, each of the mobile switching centers MSC transmits the information about the control channels of the base stations BS belonging to other operators to each of the base station BS. Each of the base stations BS stores the information about the control channels in the memory. This enables the mobile switching centers MSC to share the information about the base stations belonging to other operators and share the frame configuration of the control channels among them.

Fifth Embodiment

In the case that a plurality of different operators take an arrangement in which the areas of a plurality of base stations of the communication systems based on the same TDMA method, and the time-divided CDMA method are overlapped, each of the base stations has the function to receive control channels from other base stations in order to match the frame synchronization of the control channels of other base stations, as shown in the fourth embodiment. For example, it must be required for the base stations in a downlink to change the target for the frame synchronization when the base station BS to transmit the frame synchronization breaks down.

FIG. 29 is a diagram showing an example of changed-orders of targets for the frame synchronization stored in a memory 67 in the mobile switching center MSC of the fifth embodiment.

Information shown in FIG. 29 is stored in the memory 67 incorporated in the type setting processor 63 in the mobile switching center MSC01 in the operator A. Information regarding the base station BS74 is also stored in the memory (not shown) in the base station BS74. By using the information stored in this memory, it is possible to set the information of the target base station in advance. For example, even if one base station functioning as the standard breaks down, it is possible to select immediately another base station as a new standard base station through which the frame synchronization will be performed. Thus loss of the frame synchronization can be avoided.

As described above, according to the fifth embodiment, the information of the base station as targets for the frame synchronization is stored in the memories in the mobile switching centers MSC and the mobile stations MS in advance. For example, even if the base station having the function as the standard breaks down, it is possible to select immediately another base station that becomes a new standard base station for the frame synchronization in order to avoid losing the frame synchronization.

Sixth Embodiment

In the mobile communication system of the fifth embodiment as shown in FIG. 9, in the situation in which a base station BS belonging to one communication system is located adjacent to the base station BS belonging another communication system and the base station BS receives directly the radio wave transmitted from the adjacent base station BS, the receiver in the base station BS belonging to the mobile communication system itself receives the radio wave transmitted from an adjacent base station BS and the base station performs the frame synchronization based on the received signal.

Conversely, there is a case that the distance between both the base stations BS is long, and one base station can not receive directly the radio wave transmitted from other base station BS.

Figure 11:
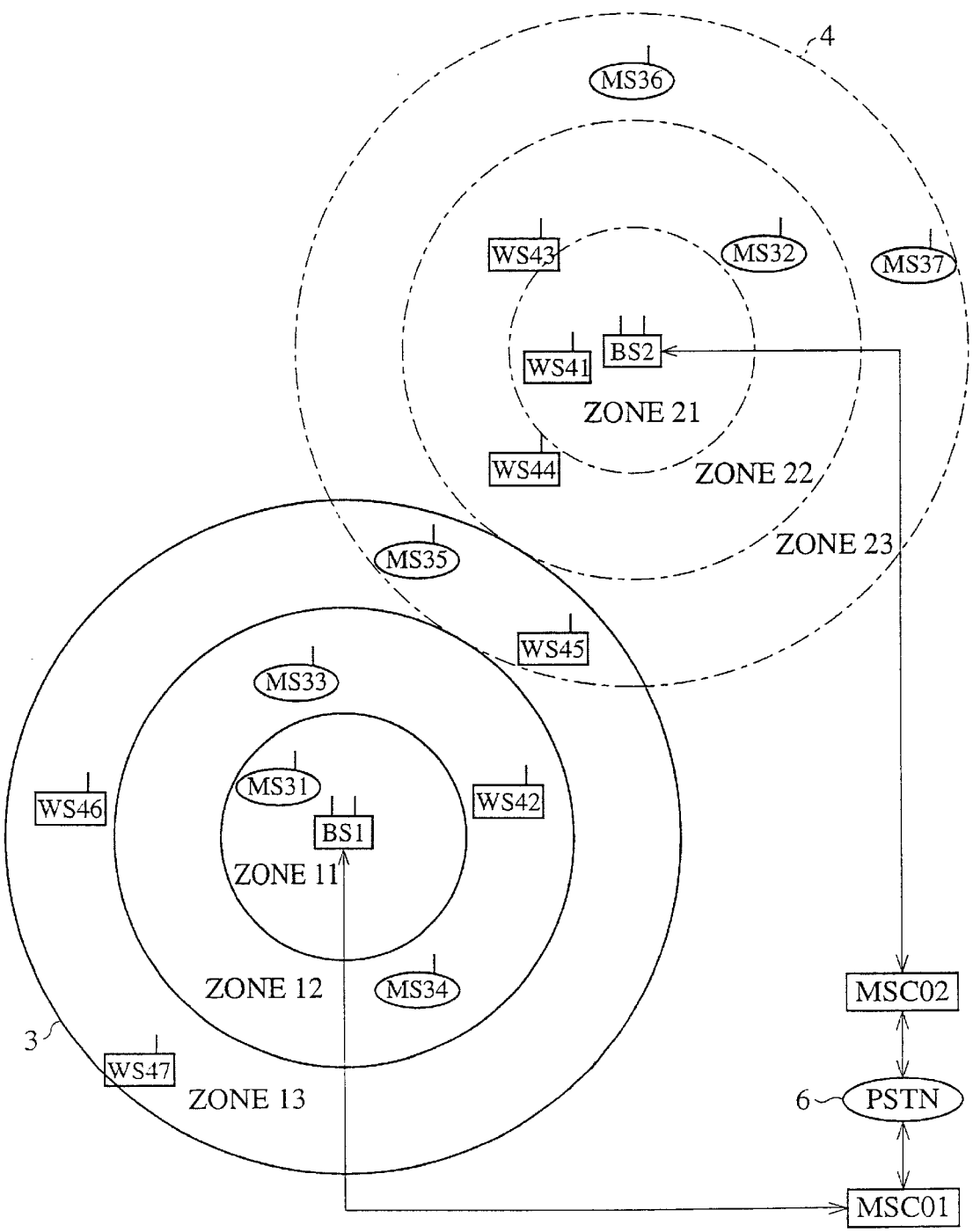
FIG. 11 is an explanation diagram showing the mobile communication system of the sixth embodiment according to the present invention.

FIG. 11 is an explanatory diagram showing the mobile communication system of the sixth embodiment according to the present invention.

Both the mobile switching center MS35 and the WLL station WS45 shown in FIG. 11 are located in a common cell part of the base stations BS1 and BS2 belonging to different operators that are adjacent to each other. It is possible for both the mobile station MS35 and the WLL station 45 to receive control channels transmitted from the two base stations BS1 and BS2.

In the mobile communication system of the sixth embodiment, the frame synchronization operation is performed when the distance between a base station BS in one communication system and a base station BS in another communication system is long.

Next, the operation will now be explained.

Figure 12:
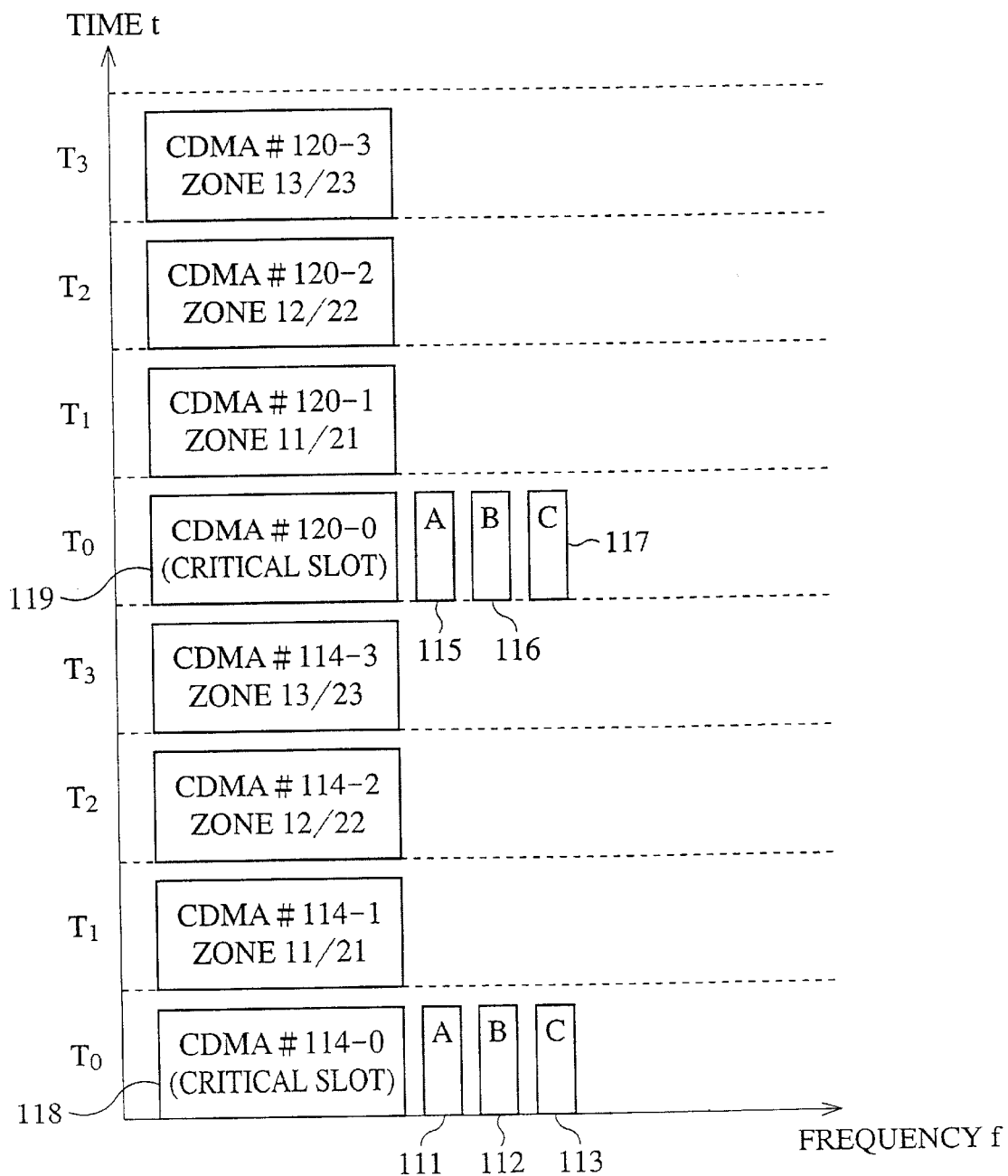
FIG. 12 is an explanation diagram showing the use of a control channel by WLL stations and the like for observing the frame synchronization between base stations belonging to a plurality of different operators in a time slot and a frequency axis in a TDMA/time-divided CDMA sharing system.

FIG. 12 is an explanatory diagram showing the use of control channels by WLL stations and the like for observing the frame synchronization between base stations belonging to a plurality of different operators on a time slot and a frequency axis in a TDMA/time-divided CDMA sharing system.

The mobile station MS35 and the WLL station WS45 are set to receive the control channel on the time slot CDMA#114-3 and transmit radio waves on the time slot CDMA#120-3. At the same time as both these two stations communicate on radio waves described above, the mobile station MS35 which communicates with the base station BS1 belonging to the operator A, receives the time slot signal B (112) for the transmission of the control channel from the base station BS2 in the operator B. Then, the mobile station MS35 transmits the information about whether or not the frame synchronization for the control channel of the operator B is shifted from the frame synchronization for the control channel of the operator A to the mobile switching center MSC02 in the operator B through the base station BS1 and the mobile switching center MSC01 in the operator A and the public switching telephone network PSTN6.

The WLL station WS45 communicating with the base station BS2 in the operator B receives the time slot signal A111 for the transmission of the control channel from the base station BS1 in the operator A while the communication using the time slot CDMA#114-3 or CDMA#120-3 is performed. Then, the WLL station WS45 transmits the information about whether or not the frame synchronization for the control channel of the operator A is shifted from that of the operator B to the mobile switching center MSC01 in the operator A through the base station BS2 and the mobile switching center MSC02 in the operator B and the public switching telephone network PSTN.

During the communication, each of the mobile station MS35 and the WLL station WS45 in the mobile communication system of the sixth embodiment respectively has the function of supervising the frame synchronization of base stations belonging to operators other than the operator with which the communication is currently performed. In addition to this function, they have the function of supervising the frame synchronization during times other than during communication. Specifically, because the WLL station is often located at one position in a semi-fixed state, for example, it is possible for the WLL station WS45 to always perform the above described function of the supervision of the frame synchronization. Of course, the mobile station and the WLL station having the function of the supervision of the frame synchronization have the hardware or the software to perform this function. Specifically, in order to perform the function of the frame synchronization supervision by the WLL station in the time other than the communication, it is possible to add the service to decrease the fee for telephone calls of subscribers having such as said WLL station by the operator A or the operator B.

There is a situation in which both two base stations BS performing the frame synchronization operation are separated from each other, and do not receive directly the radio waves from the other base station BS, and there is no WLL station; to receive the radio wave from both the base stations BS. In this case, because there is no WLL station, it is not the case that no frame synchronization is required. Naturally a supervision station must be placed at the position where the radio waves from both the two base stations BS can be received. The supervision station has the means to receive signals from a plurality of two or more base stations BS and to transmit information about a difference between the frames to the base stations BS.

As described above, according to the sixth embodiment, each of the mobile stations MS and the WLL stations in the mobile communication system has the function of supervising the frame synchronization of the base station in an operator other than the operator with which the communication is currently performed. In addition to this, each has the function of supervising the frame synchronization during other times than during communication. The mobile station BS and the WLL station has the hardware or the software to realize the function of the supervision of the frame synchronization. It is thereby possible for the base station BS to synchronize its own frame with the frame of other base station based on the time difference information in the frame synchronization transmitted from both the base stations even if both the two base stations BS do not receive directly the radio waves from the other adjacent base station BS.

Seventh Embodiment

Figure 13:
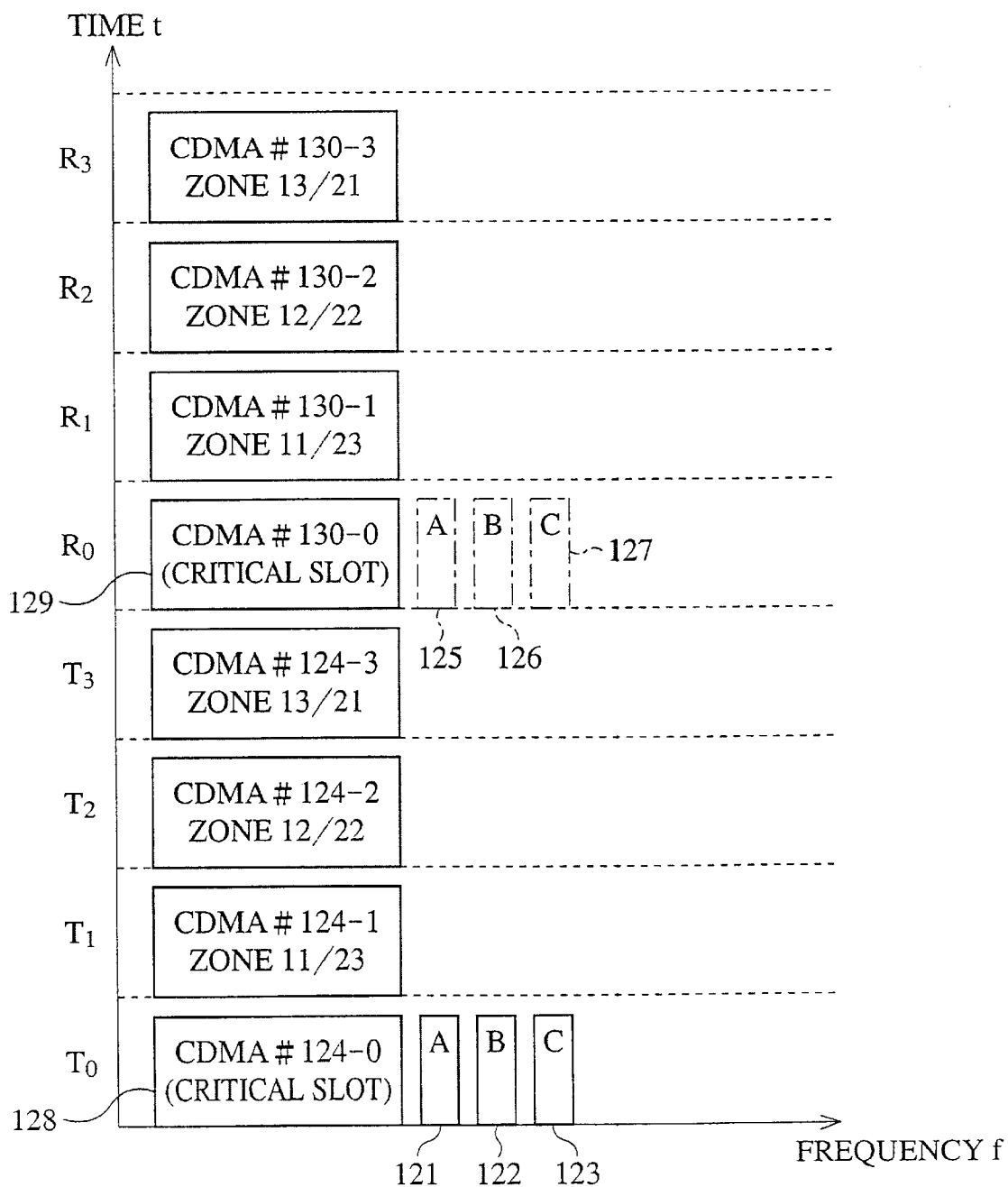
FIGS. 13 and 14 are explanatory diagrams showing examples when time slots are assigned into concentric circle zones in adjacent cells to each other in the mobile communication system of the seventh embodiment according to the present invention.
Figure 14:
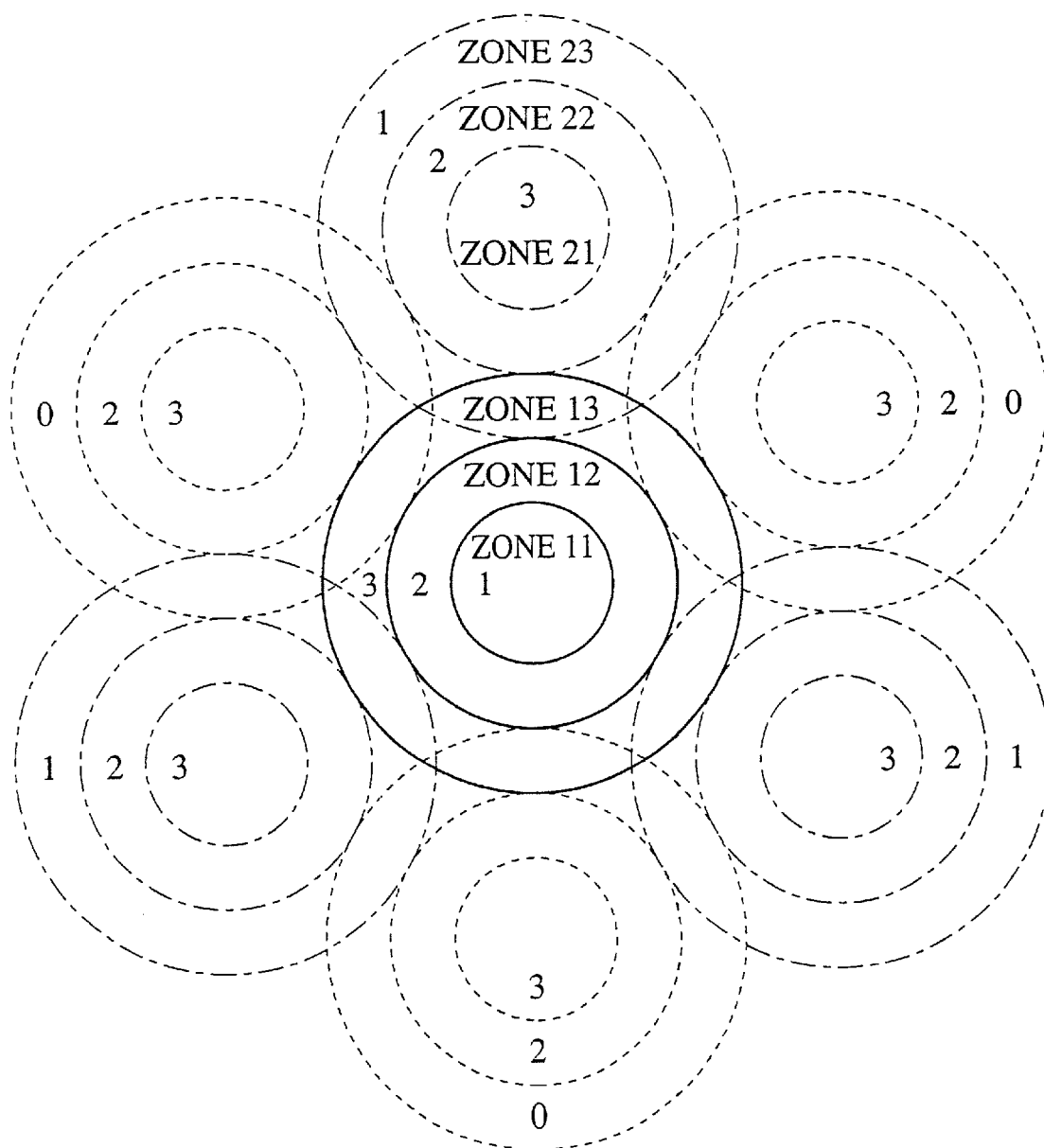

FIGS. 13 and 14 are explanatory diagrams showing examples when time slots are assigned into concentric circle zones in adjacent cells to each other in the mobile communication system of the seventh embodiment according to the present invention.

Each of the mobile stations BS, the WLL stations, the base stations BS in the mobile communication system of the seventh embodiment has a channel information processing section. The mobile switching center MSC generates the indication information and transmits it to the mobile station MS, the WLL stations, and the base stations BS. The mobile station MS, the WLL stations, and the base stations BS receive this indication information. The channel information processing section incorporated in the mobile station MS, the WLL stations, and the base stations BS transmits and receives radio waves by using the designated time slot according to the received instruction information.

Next, the operation will now be explained.

The zone 11 and the zone 23 are assigned into one time slot, as the time slot CDMA#124-1 shown in FIG. 13. As shown in FIG. 14, the zone 11 and the zone 23, both of which are assigned into the same time slot, belong to different cells, respectively, and the concentric circles assigned to both the zones do not cross with each other. It is possible to set a cell to be the center and peripheral six cells of the center cell so that the zones in the cells assigned to a same time slot are not overlapped.

The mobile switching center MSC designates an available time slot and transmits it to the mobile stations MS, the WLL stations, and the base stations BS. Each of the mobile stations MS, the WLL stations, and the base stations BS receives the instruction transmitted from the mobile switching center MSC. The channel information processing section incorporated in each of the mobile stations MS, the WLL stations, and the base stations BS transmits and receives the radio waves by using the designated time slot according to the instruction transmitted from the mobile switching center MSC.

As described above, according to the seventh embodiment, zones and time slots are combined by the control of the mobile switching center MSC. That is to say, the assignment of different zones in which there are signals having different powers into a same time slot can be avoided. It is thereby possible to eliminate the deterioration of the communication efficiency which is essentially involved in the CDMA method. That is to say, the deterioration in which a transmission signal having a large power suppresses a transmission signal having a small power.

Eighth Embodiment

Figure 15:
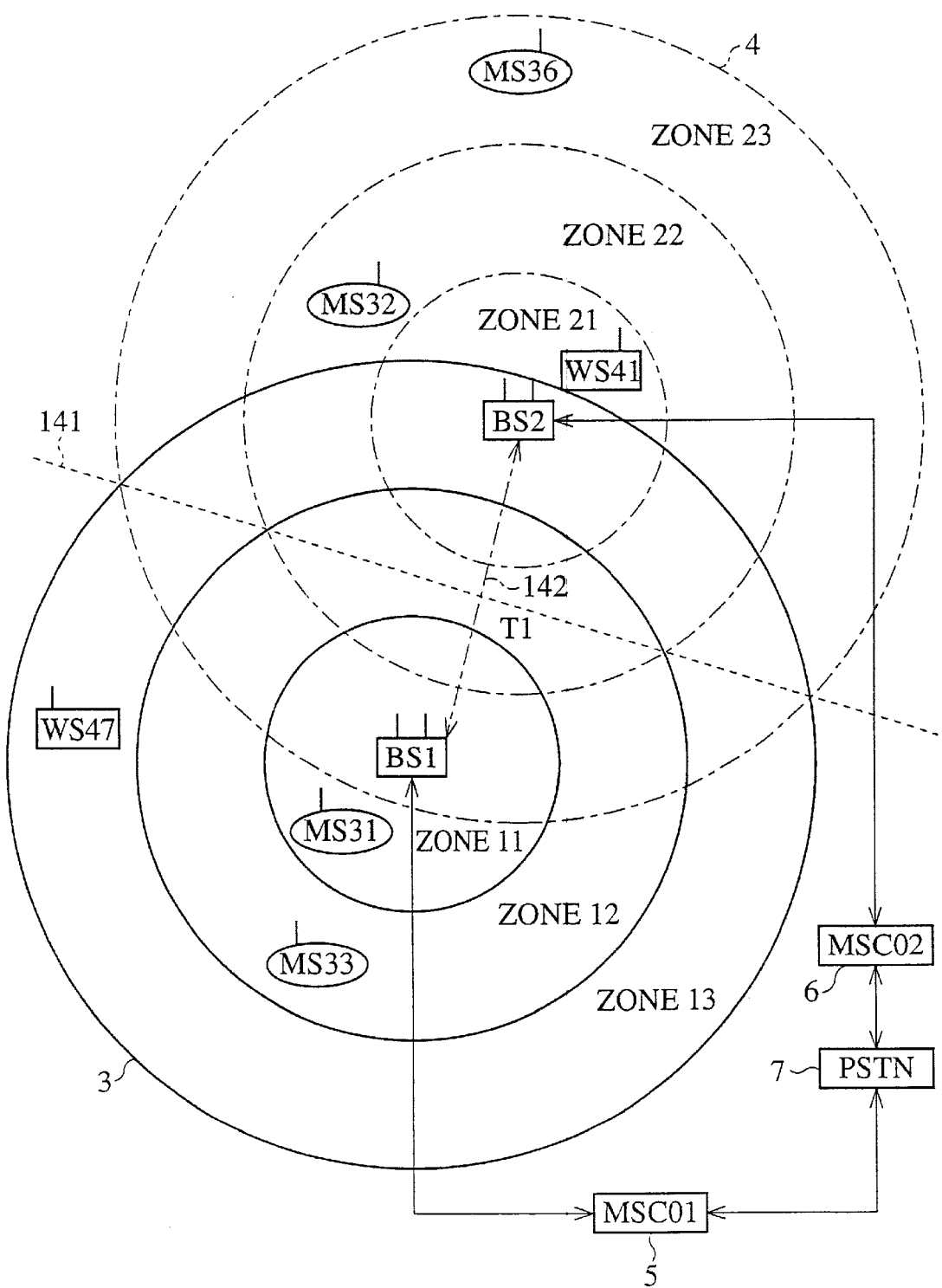
FIG. 15 is an explanatory diagram showing the mobile communication system of the eighth embodiment according to the present invention.

FIG. 15 is an explanatory diagram showing the mobile communication system of the eighth embodiment according to the present invention. The mobile communication system of the eighth embodiment is different from the mobile communication system of the sixth embodiment and relates to the case that both base stations BS1 and BS2 are located at the position where one base station BS can receive radio waves transmitted from the other base station BS. As shown in FIG. 15, the base station BS2 receives radio waves transmitted from the base station BS1 and controls so that the frame synchronization in the base station BS2 itself is matched to the frame synchronization in the base station BS1.

Next, the operation will be explained.

Figure 16:
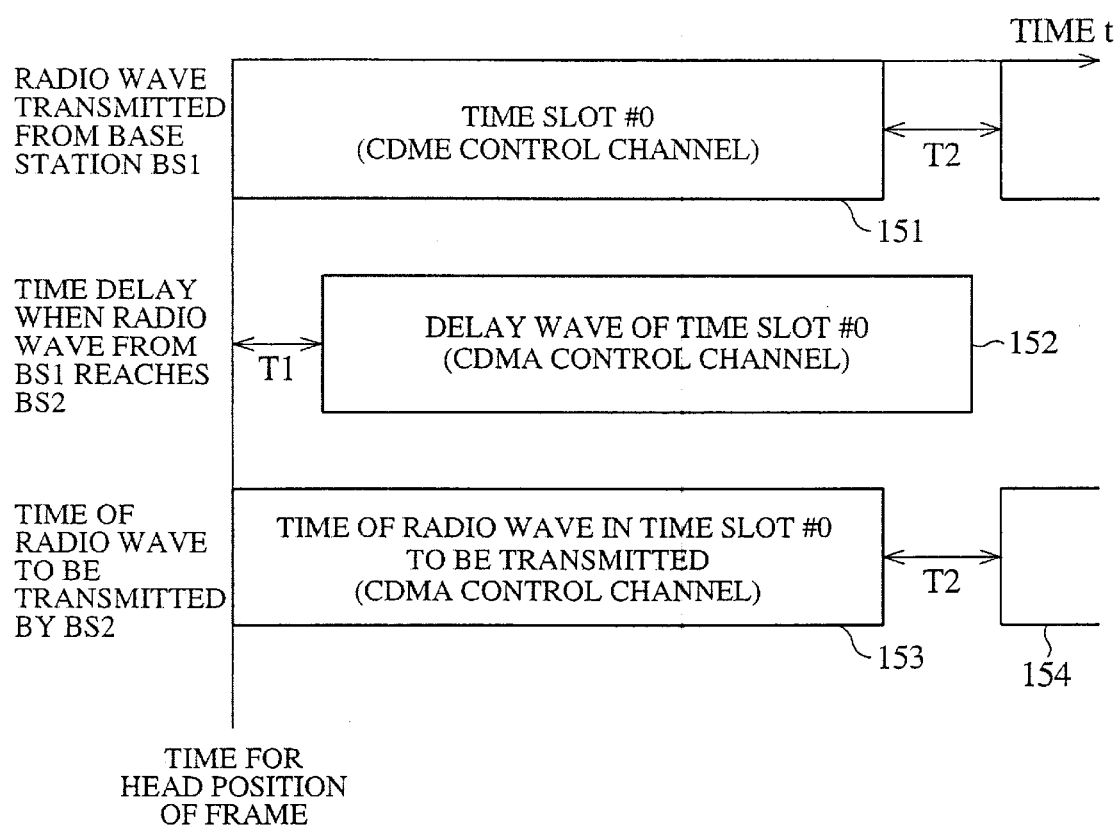
FIG. 16 is an explanatory diagram showing the relationship among delay times of radio waves transmitted from different base stations.

FIG. 16 is an explanatory diagram showing the relationship among delay times of radio waves transmitted from different base stations BS. FIG. 16 shows that the base station BS1 transmits the time slot 151 as the head of the frame. The radio wave of the time slot 151 reaches the base station BS2 after the delay time T1. Based on the delay of this radio wave, the base station BS2 sets the transmission timing to transmit the radio wave before the time T1 counted from the time that the base station BS2 receive the radio wave transmitted from the base station BS1, that a frame synchronization is coincided at the intermediate point between the two base stations. In this case, the mobile switching center MSC generates the instruction information, and transmits it to the mobile stations MS, the WLL stations, and the base stations BS. The mobile stations MS, the WLL stations, and the base stations BS receive this instruction information. The channel information processing section incorporated in each of the mobile stations MS, the WLL stations, and the base stations BS transmits and receives the radio waves by using the designated time slot according to the received instruction.

When the two base stations BS belong to the same operator, the relative position of the base station BS is not the arrangement shown in FIG. 15. As shown in FIG. 11, the base stations are located so that the area of the base station BS1 does not overlap greatly with the area of the base station BS2. That is, the example indicated in FIG. 15 shows that the base station BS1 and the BS2 belong to different operators.

In the case shown in FIG. 15, when the size of the cell 3 or the cell 4 becomes approximately several tens of Km, interference is caused because the delay time caused at the peripheral regions overlap with the following time slot of other base station BS. FIG. 16 shows the case in which the time slots 152 and 154 do not overlap with each other.

Figure 17:
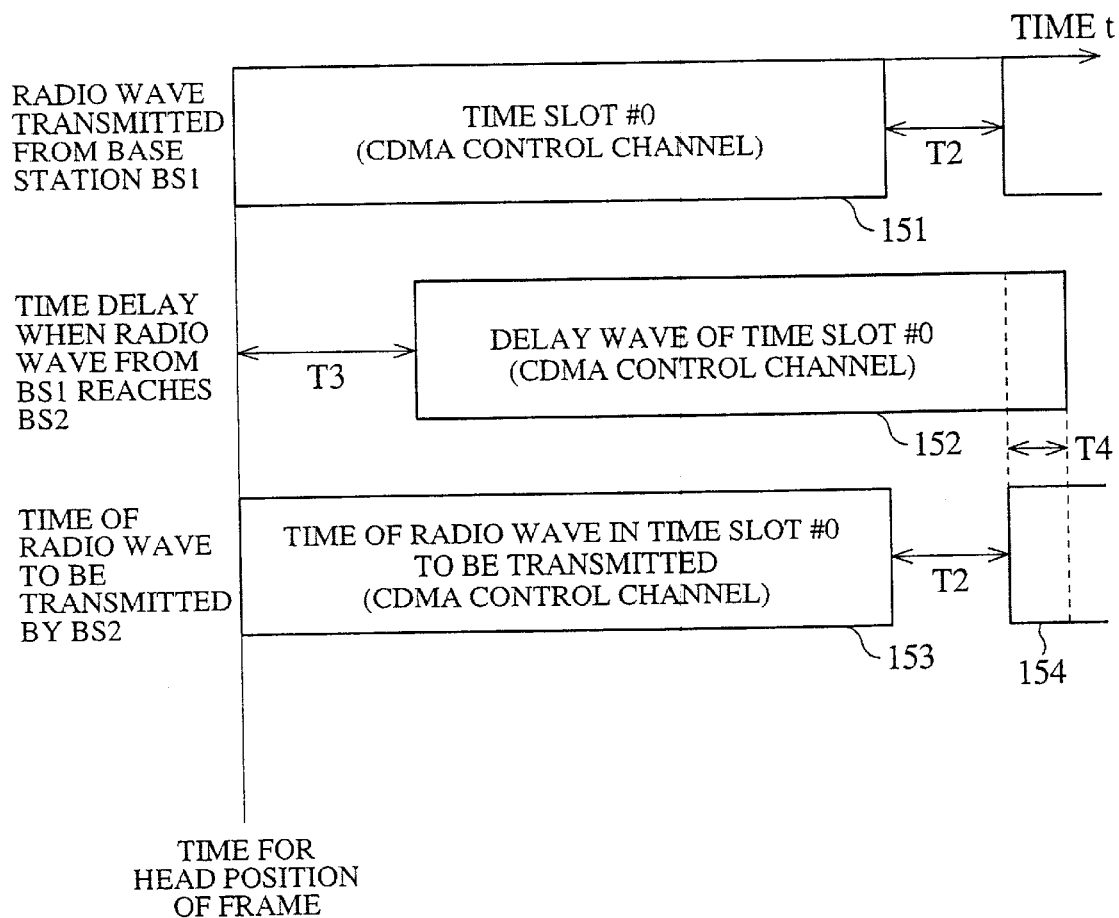
FIG. 17 is an explanatory diagram showing the relationship among delay times of radio waves transmitted from different base stations The distance between these base stations varies greatly.

FIG. 17 is an explanatory diagram showing the relationship among delay times of radio waves transmitted from different base stations, the distance between these base stations being large.

Because the distance between the base station BS1 and the base station BS2 is large, the delayed time slot 152 overlaps with the head position of the following time slot 154. The example in FIG. 17 shows that there is a possibility that an error rate in the overlapped area increases. That is, when the time T3>the time T2 in FIG. 17, the delayed time slot 152 overlaps with the following time slot 154. This causes communication interference.

For example, in a Personal Handy Phone system (hereinafter, referred to as PHS system), because time T2=41.7 μs(guard time), when the area of radio waves of one's own base station BS includes the position of the other base station BS, that is, like the case of the base station BS1 and the base station BS2 shown in FIG. 15, it is basically and logically possible to realize a communication system in which the distance between base stations is up to 12.5 Km. (In the PHS system, because the maximum transmission power is not more than 10 mW, the possible distance of the communication to the base station is less).

As described above, in the Personal Communication System (Hereinafter referred to as PCS), because the possible distance for the communication is not more than 12.5 Km, although the time length 41.7 μs of the guard time is adequate as regards distance, this time length is reduced in the Cellular Communication System (hereinafter referred to as cellular).

In the Personal Digital cellular Telecom System (Hereinafter referred to as PDC) as in the Cellular, the shortest guard time is 142.81 μs of 6 bits. PDC values which can be used in this vehicle telephone are not less than three times of that of the PHS as a walker s personal phone (PCS). Thereby, the time length of the guard time is different corresponding to using states.

Figure 18:
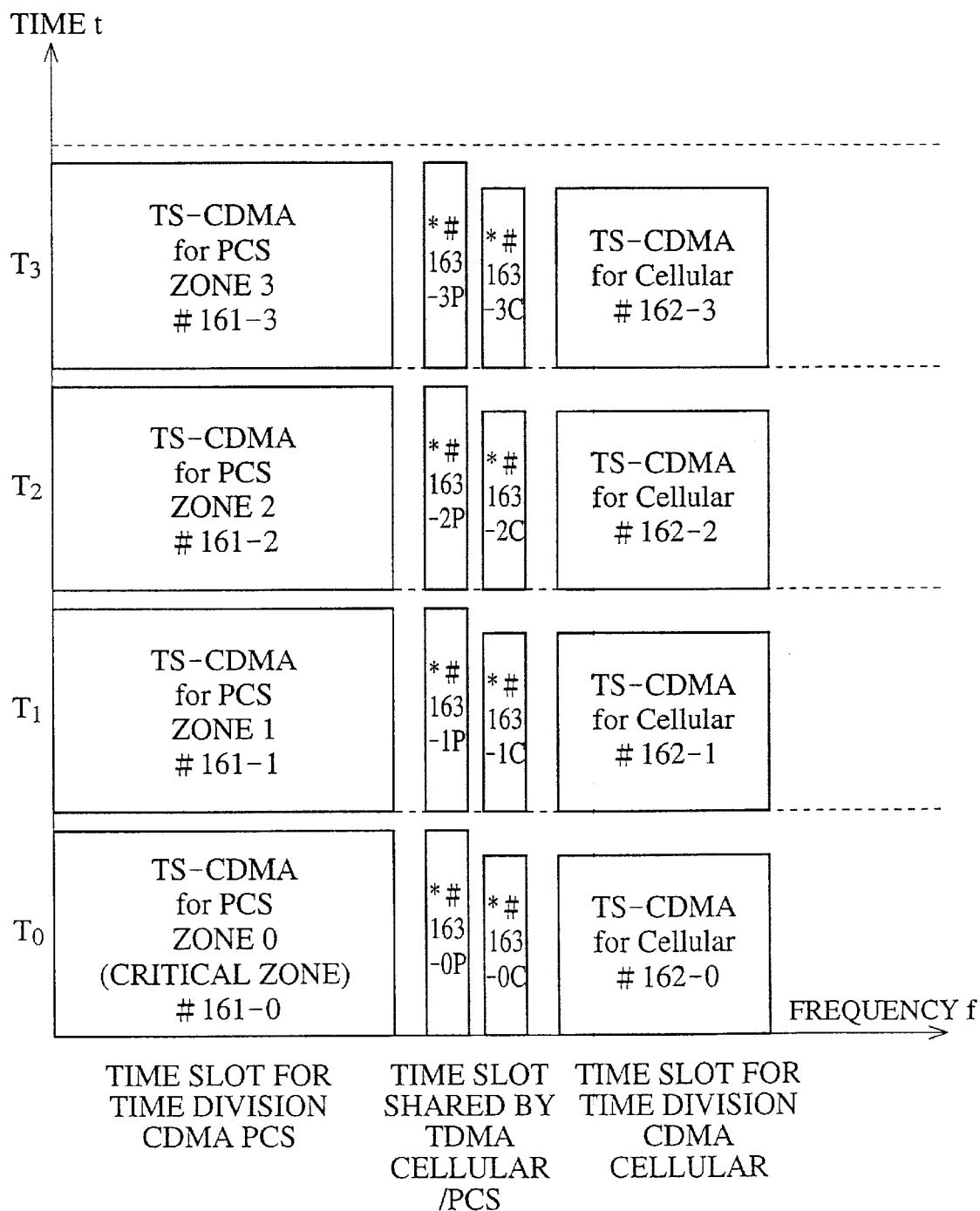
FIG. 18 is an explanatory diagram showing a common mobile communication system having time-divided CDMA signals/TDMA signals (designated by the reference character *) having different time slot lengths in cellular and PCS.

FIG. 18 is an explanation diagram showing a common mobile communication system having time-divided CDMA signals/TDMA signals (designated by the reference character *) having different time slot lengths in cellular and PCS.

FIG. 18 shows the example in which the time slot of the time-divided CDMA system is slightly different between the cellular and PCS. The cellular which has a longer guard time (possible time slot used is short) has lower time efficiency than that of the PCS which has a shorter guard time (possible time slot used is long). This drawback is introduced by the advantage of covering a larger area and also corresponds to the advantage of the higher using efficiency of the PCS having a small cell.

In addition, on comparison with the continuous time CDMA method, the efficiency of the time slot CDMA method (TS-CDMA method) is reduced by the guard time. However, it is possible to eliminate the decreased use efficiency of the continuous time CDMA method, caused when a large power signal suppresses a small power signal, by changing the time slot according to the magnitude of the transmission power.

Figure 19:
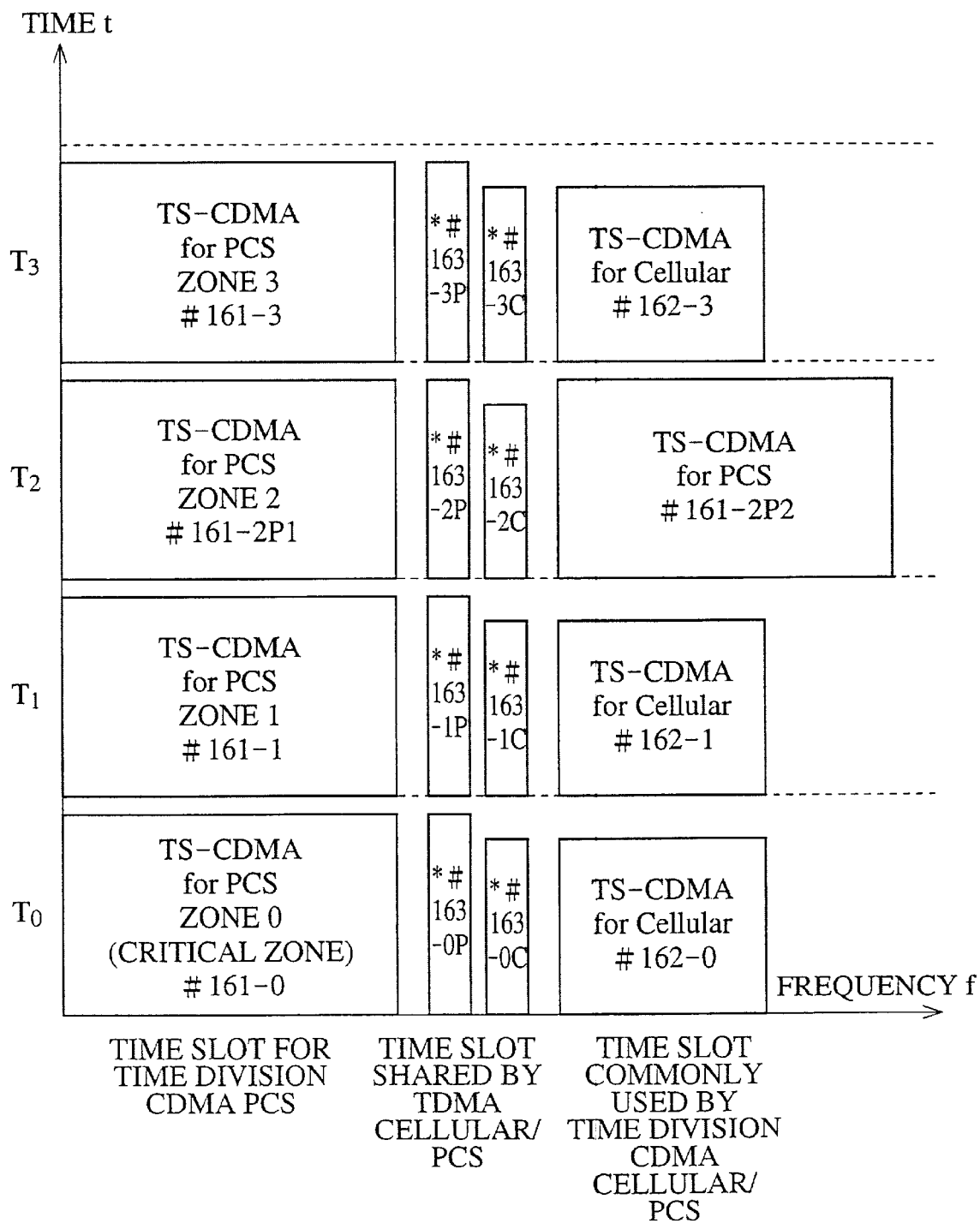
FIG. 19 is an explanatory diagram showing PCS time slots in a cellular frequency band in a common mobile communication system having time-divided CDMA signals/ TDMA signals (designated by the reference character *) having different lengths of time slots in cellular and PCS.

FIG. 19 is an explanatory diagram showing PCS time slots in a cellular frequency band in a common mobile communication system having time-divided CDMA signals/TDMA signals (designated by the reference character * ) having different time slot lengths in cellular and PCS.

As shown in FIG. 19, the PCS time slot is inserted into the cellular frequency band (see TD-CDMA for PCS#161-2P2). Because the cellular PCS uses the same frame, the traffic amount handled by the cellular is small. It is possible to use the time slot, that has been assigned to the cellular, by the PICS when the traffic amount of the PCS communication is large. In this case, the mobile switching center MSC generates instruction information and transmits it to the mobile stations MS, the WLL stations, and the base stations BS. The mobile stations MS, the WLL stations, and the base stations BS receive this instruction information. The channel information processing section incorporated in each of the mobile stations MS, the WLL stations, and the base stations BS transmits and receives the radio waves by using the designated time slot according to, the received instruction information.

As described above, according to the eighth embodiment, under the control of the mobile switching center MSC, one base station BS controls so that its own frame is synchronized to the frame from the other base station BS, and receives and uses the information from the other communication system. It is thereby possible to match efficiently the increase and the decrease of the traffic amount of speech. For example, it is possible to construct a common system or a sharing system in which the control channel of the time-divided CDMA method can use the information of the TDMA method, or the TDMA control channel can use the notice information of the time-divided CDMA method. Thus, it is possible to receive and use the information of the other communication system.

Ninth Embodiment

Figure 20:
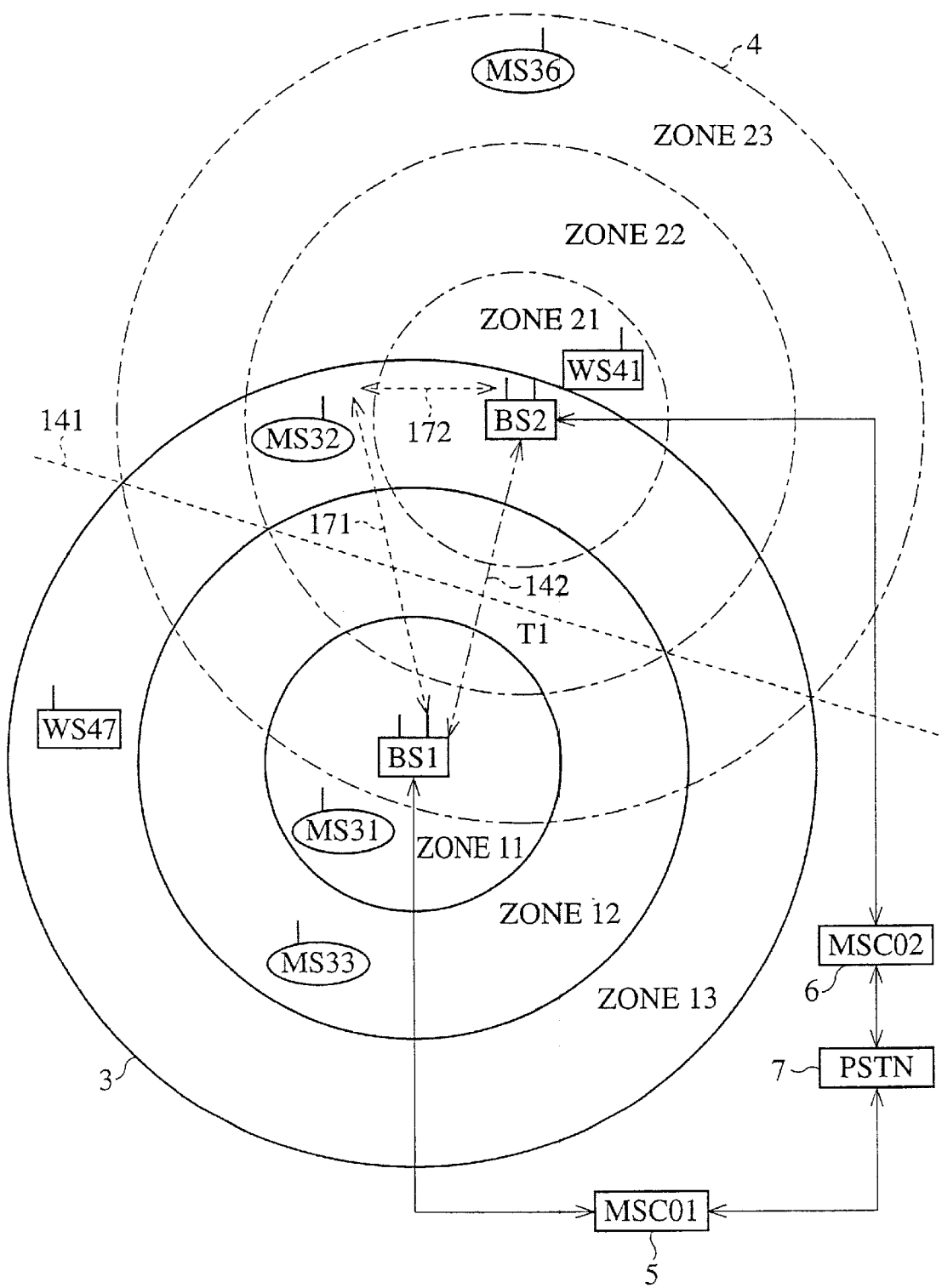
FIG. 20 is an explanatory diagram showing a frame synchronization between adjacent base stations belonging to different two communication systems in the mobile communication system of the ninth embodiment according to the present invention.
Figure 21:
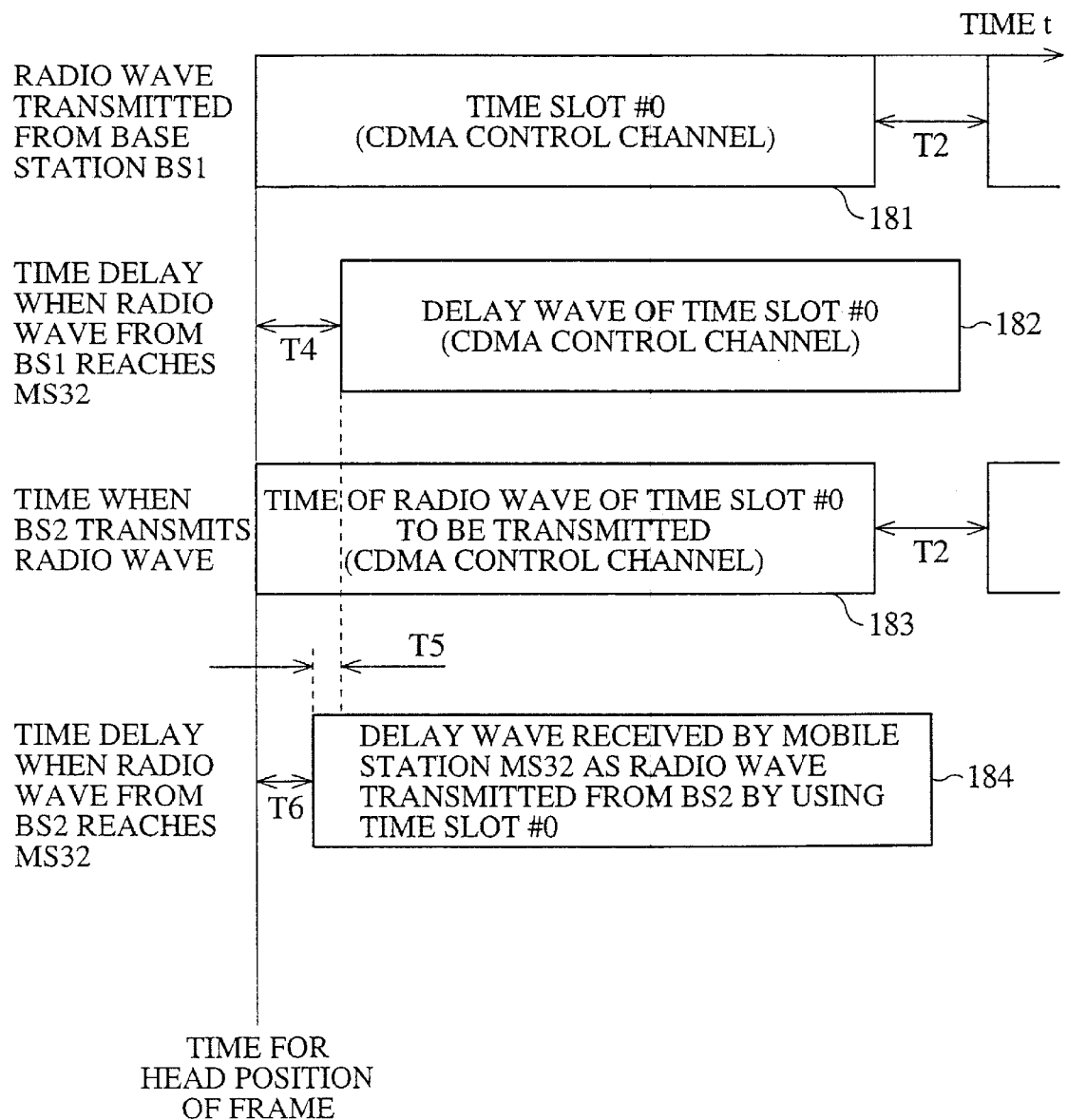
FIG. 21 is an explanatory diagram showing the relationship of time delay of radio waves, at a mobile station, transmitted from different base stations.
Figure 22:
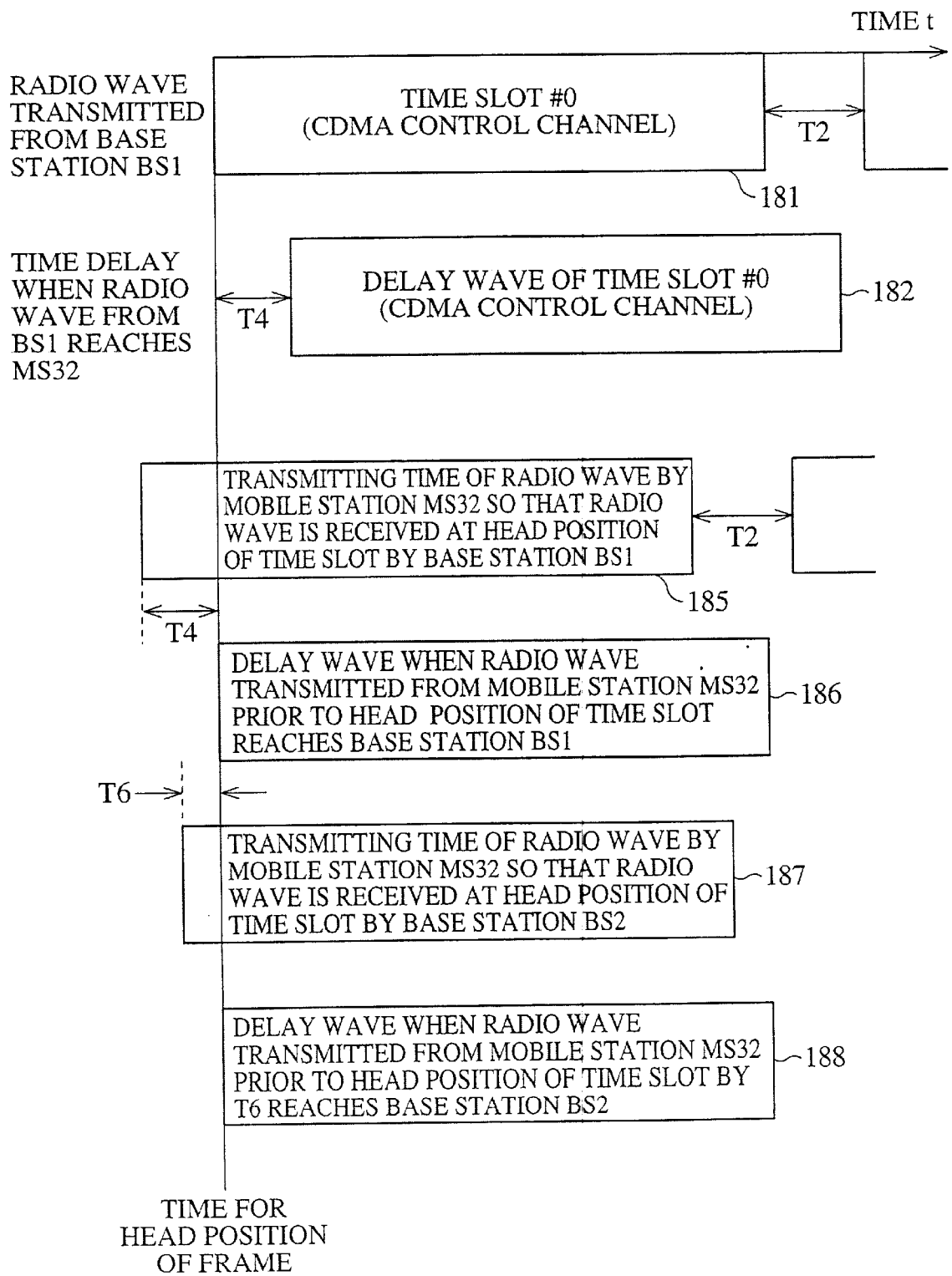
FIG. 22 is an explanatory diagram showing the relationship of time delay when a radio wave transmitted from a mobile station is received by a base station.

FIG. 20 is an explanation diagram showing frame synchronization between adjacent base stations belonging to different two communication systems in the mobile communication system of the ninth embodiment according to the present invention. FIG. 21 is an explanatory diagram showing the relationship of time delay of radio waves, at a mobile station, transmitted from different base stations BS. FIG. 22 is an explanatory diagram showing the relationship of time delay when a radio wave transmitted from a mobile station MS is received by a base station.

The mobile communication system of the ninth embodiment relates to a communication control using the time relationship information performed between the mobile station MS and a plurality of base stations BS.

Next, the operation will be explained.

It is assumed that the mobile station MS32 is communicating with the base station BS1. In this case, the base station BS1 transmits the radio wave 181 shown in FIG. 21. Then, the radio wave 181 reaches the mobile station MS32 after time T4 (see the radio wave 182). In this case, the mobile station MS32 can not determine the time length T4. The mobile station MS32 can not determine the time of the head position of the time slot. That is, the mobile station MS32 only determines the reception of the radio wave 182. The mobile station MS32 transmits the radio wave 185 shown in FIG. 22 in a uplink in which the radio wave is transferred from the mobile station MS to the base station BS and is controlled by the base station BS1 so that the radio wave 185 is shifted to the head position of the time slot.

That is, the mobile station MS adjusts, namely advances or delays, the transmitting time of the radio wave according to the instruction transmitted from the base station BS1 so that, as shown in FIG. 22, the head position of the radio wave 186 coincides with the head position of the time slot. After the completion of this adjustment, the mobile station MS32 recognizes that the half position of the time difference between the radio wave 185 and the received radio wave 182 is the head position of the time slot, for example. Thereby, the mobile station MS32 can determine the delay time T4.

On the other hand, the base station BS1 does not have the information about the delay time T4. The base station BS1 can determine the delay time T4 for the first time when receiving the information about the delay time T4 from the mobile station MS32. The information of the delay time T4 is stored in the memory in the base station BS1 and also in the memory 67 in the mobile switching center MSC01.

FIG. 30 is a diagram showing the information of the delay time stored in the memory 67 incorporated in the mobile switching center MSC01.

In addition, as shown in FIG. 21, when the base station BS2 transmits the radio wave 183, the mobile station MS32 receives the radio wave 183 transmitted from the base station BS2 as the radio wave 184. In this case, the mobile station MS32 only recognizes directly the time difference T5 between the radio wave 184 and the radio wave 182 as the radio wave 181 transmitted from the base station BS1. The mobile station MS32 transmits the information of the time difference T5 to the base station BS1. The mobile switching center MSC01 calculates the time difference T6 based on the information of the delay time T4 and the information of the time difference T5 obtained through the base station BS1. These time information T4, T5, and T6 are transmitted to the mobile switching center MSC02 in the second mobile communication system through the public switching telephone network PSTN7. Thus, the various time information about the mobile station MS32 shown in FIG. 30 are stored in the memory 67 in the mobile switching center MSC, accordingly, in the transmission of the radio wave from the mobile station MS32 to the base station BS2, when the mobile station MS32 transmits the radio wave at the time before the head of the time slot by the time T6, it can be set so that the base station BS2 can receive the radio wave, 188 at the head position of the time slot.

It is possible to set the time position to transmit the radio wave by using the processes described above when the mobile station MS32 performs a hand-off operation from the base station BS1 to the base station BS2. It is possible to set the time information so that each communication system can use the time information by storing the time information to transmit the radio wave in the memory in the type setting processor incorporated in each mobile station MSC in a different mobile communication system.

With each movement of the mobile station MS, or every elapsing of a predetermined time period, by performing this time information setting process, the mobile switching center MSC can always indicate the most proper time position of the time slot to each of the mobile stations MS, the WLL stations, the base stations BS and the like.

As described above, according to the ninth embodiment, the time information is stored in the memory in the type setting processor incorporated in the mobile switching center MSC in the mobile communication system, the mobile communication system is constructed so that every communication system can use the time information of the time slot. Thereby, the time information setting process is performed with every movement of the mobile station MS, or every elapse of a predetermined time period. It is possible for the mobile switching center MSC to always indicate the information of the most proper time of the time slot to each of the mobile stations MS, the WLL stations, the base stations. BS, and the like.

INDUSTRIAL APPLICABILITY

As set forth above, the mobile communication system of the present invention establishes the frame synchronization among the base stations in the WLL or the mobile communication system sharing the TDMA method and the time-divided CDMA method based on the transmitted radio waves. It is suitable to apply the present invention to mobile communication system in which a cellular communication system and a PCS communication system, where each burst signal length in time slots is different, are performed under the same communication system, namely the same frame synchronization.

What is claimed is:

1. A mobile communication system with shared time slots and shared frequency channels comprising:

a plurality of mobile stations such as automobile telephones and portable telephone units;

at least one base station; and at least one mobile switching center connected to the base station, radio communication between said mobile stations and said base station being performed by using time-divided code division multiple access (CDMA) signals that share time slots and frequencies with time division multiple access (TDMA) signals or share only time slots with TDMA signals, wherein said mobile switching center comprises:

time slot management means for controlling a transmission power of a TDMA signal sharing a time slot and a frequency channel with a time-divided CDMA signal to a minimum necessary level so as to improve the quality of the CDMA signal.

2. A mobile communication system as claimed in claim 1, further comprising at least one wireless local loop (WLL), wherein the mobile switching center comprises a memory, the mobile switching center identifies the WLL station belonging to the base station connected to the mobile switching center, stores radio information and relationship information of the WLL station as station identification information in the memory, and the mobile switching center uses the relationship information of the WLL station stored in the memory when initiating communication with the WLL station.

3. A mobile communication system as claimed in claim 2, wherein when completing the radio communication with the WLL station, the mobile switching center updates the relationship information of the WLL station stored in the memory by using relationship information obtained by radio communication.

4. A mobile communication system as claimed in claim 2, wherein when starting a radio communication with the WLL station, the mobile switching center transmits the relationship information of the WLL station to the base station, the base station receives the relationship information of the WLL station, a transmitter incorporated in the base station controls a transmission power of a radio wave which is sent to the WLL station according to a position of the WLL station by using the received relationship information of the WLL station, and transmits the radio wave of a controlled transmission power to the WLL station.

5. A mobile communication system as claimed in claim 2, wherein when starting a radio communication with the WLL station, the mobile switching center controls the transmission power of a radio wave transmitted from the base station connected to the WLL station according to a position of the WLL station by using the relationship information of the WLL station stored in the memory and a time slot to be used for communication with said WLL station is set to a time slot corresponding to the transmission power of the radio wave.

6. A mobile communication system as claimed in claim 2, wherein the mobile switching center classifies said at least one mobile station and said at least one WLL station according to a magnitude of a transmission power of the TDMA signal, assigns a different time slot to each classification, sets zones in one cell in a virtual manner for each classification, and locates the mobile station and the WLL station using the TDMA signals sharing time slots and frequency channels with time-divided CDMA signals in a zone of said base station, and the mobile switching center stores allocation information of the mobile station and the WLL station in the memory for controlling.

7. A mobile communication system as claimed in claim 1, further comprising at least one wireless local loop (WLL), wherein a transmitter in each of the mobile stations, the WLL stations, and the base stations controls, under the control of the mobile switching center, transmission power of at least one of said plurality of TDMA signals that shares a time slot and frequency channel with at least one of said time-divided CDMA signals.

8. A mobile communication system as claimed in claim 7, wherein the mobile switching center classifies said at least one mobile station and said at least one WLL station according to a magnitude of a transmission power of the TDMA signals that share time slots and frequency channels with time-divided CDMA signals, and assigns a different time slot to each classification.

9. A mobile communication system as claimed in claim 1, wherein even if any subscriber is not calling a WLL station, the WLL station is capable of receiving a plurality of control channels transmitted from the plurality of base stations, of measuring the time difference between frame synchronization information of the plurality of base stations, and of transmitting the measured information of the time difference to one of, both of, or the plurality of base stations.

10. A mobile communication system with shared time slots and shared frequency channels comprising:

a plurality of mobile stations such as automobile telephones and portable telephone units;

at least one wireless local loop (WLL) station;

at least one base station; and at least one mobile switching center connected to the base station, radio communication being performed between said mobile stations and said base station by using time-divided code division multiple access (CDMA) signals that share time slots and frequencies with time division multiple access (TDMA) signals or share only time slots with TDMA signals, wherein said mobile switching center comprises:

control channel allocation means for determining whether to allow said base station, said mobile stations and said WLL station to use a TDMA signal as the control channel, to use one of a TDMA signal and a time-divided CDMA signal selected in accordance with a level of congestion, to use a TDMA signal and a time-divided CDMA signal alternatively depending on a current frame being transmitted, or to use a plurality of TDMA signals and a plurality of time-divided CDMA signals alternately depending on a current frame being transmitted.

11. A mobile communication system as claimed in claim 10, wherein the mobile station or the WLL station transmits and receives the control signal of the time-divided CDMA method and the control signal of the TDMA method and, at the same time, processes information relating to the control signal of the time-divided CDMA method and information relating to the control signal of the TDMA method, receives the TDMA control channel information and the time-divided CDMA control channel information while in a state of receiving broadcasting control channel information, and when communicating the control information, selects one of the TDMA control channel and the time-divided CDMA control channel and transmits the control information to the base station and the mobile switching center using the selected control channel.

12. A mobile communication system as claimed in claim 10, wherein either the base station or the mobile switching center, or both the base station and the mobile switching center, transmit and receive the control signal of the time-divided CDMA method and the control signal of the TDMA method and, at the same time, process information relating to the control signal of the time-divided CDMA method and information relating to the control signal of the TDMA method, or select either processing of the information relating to the control signal of the time-divided CDMA method or processing of the information relating to the control signal of the TDMA method.

13. A mobile communication system as claimed in claim 10, wherein either the base station or the mobile switching center, or both the base station and the mobile switching center, transmit and receive the control signal of the time-divided CDMA method and the control signal of the TDMA method and, at the same time, process information relating to the control signal of the time-divided CDMA method and information relating to the control signal of the TDMA method, and broadcast information relating to a traffic rate of the time-divided CDMA control channel and the TDMA control channel through a broadcasting control channel of the time-divided CDMA control channel and the TDMA control channel, and the mobile station or the WLL station selects one of the time-divided CDMA control channel and the TDMA control channel.

14. A mobile communication system as claimed in claim 10, wherein either the base station or the mobile switching center, or both the base station and the mobile switching center, transmit and receive the control signal of the time-divided CDMA method and the control signal of the TDMA method and, at the same time, process information relating to the control signal of the time-divided CDMA method and information relating to the control signal of the TDMA method, transmit and receive the time-divided CDMA control channel by using one time frame, and transmit and receive the TDMA control channel by using a following time frame so that the time-divided CDMA control channel and the TDMA control channel are transmitted and received alternately per frame.

15. A synchronized multi-operator mobile communication system with shared time slots and shared frequency channels comprising:
    a plurality of mobile stations such as automobile telephones and portable telephone units;
    at least one wireless local loop (WLL) station;
    a plurality of base stations belonging to respective multiple operators; and
    a plurality of mobile switching centers belonging to respective operators of different radio communication systems, and connected to respective ones of said plurality of base stations,
    radio communication being performed between said mobile stations and said base stations by using time-divided code division multiple access (CDMA) signals that share time slots and frequencies with time division multiple access (TDMA) signals or share only time slots with TDMA signals, wherein
    each of said mobile switching centers comprises:
        information storing means for storing information related to control channels provided by said plurality of base stations; and
    each of said plurality of base stations comprises:
        control signal transmitting means for transmitting either a TDMA control signal or a time-divided CDMA control signal; and
        time slot and frequency channel configuration sharing means for sharing the same time slot and frequency channel configuration for frame synchronization, by selectively using a control signal transmitted from a reference base station belonging to a different operator, in accordance with the information stored in said information storing means.

16. A mobile communication system as claimed in claim 15, wherein each of the plurality of base stations transmits the TDMA control signal or the time-divided CDMA control signal, one base station belonging to one operator interrupts the transmission of the control signal in a time slot while transmitting notice information to the mobile stations or to the WLL stations, and receives a control signal of another base station belonging to another operator during the interrupted time slot and synchronizes its own time frame with a time frame of the other base station belonging to the other operator.

17. A mobile communication system as claimed in claim 16, wherein when a base station belonging to an operator and acting as the standard breaks down and interrupts the transmission of the control channel, the plurality of base stations select and use a control channel of another base station belonging to another operator as an alternative standard.

18. A mobile communication system as claimed in claim 17, wherein when a base station belonging to an operator and acting as the standard breaks down and interrupts the transmission of the control channel, the plurality of base stations select and use a control channel of other base station belonging to other operator as an alternative standard, and the plurality of base stations and the mobile switching centers stores the order of the other base station to be the standard into a memory incorporated in each of the plurality of base stations and the mobile switching centers, and abandon the failed base station as the standard, and newly select another base station as the standard for frame synchronization according to the order stored in the memory.

19. A synchronized multi-operator mobile communication system with shared time slots and shared frequency channels comprising:
    a plurality of mobile stations such as automobile telephones and portable telephone units;
    a at least one wireless local loop (WLL) station;
    a plurality of base stations belonging to respective multiple operators; and
    a plurality of mobile switching centers belonging to respective operators of different radio communication systems, and connected to respective ones of said plurality of base stations,
    radio communication being performed between said mobile stations and said base stations by using time-divided code division multiple access (CDMA) signals that share time slots and frequencies with time division multiple access (TDMA) signals or share only time slots with TDMA signals, wherein
    each of said plurality of mobile stations comprises:
        monitoring means for receiving control signals from base stations belonging to different operators, so as to collect time-difference information indicating a time difference between the received control signals, and for transmitting the time-difference information to a selected one of said plurality of base stations via selected ones of said plurality of mobile switching centers; and
    each of said plurality of base stations comprises:
        frame synchronization recovery means for recovering frame synchronization between said plurality of base stations in accordance with the time-difference information transmitted from each of said plurality of mobile stations.

20. A mobile communication system as claimed in claim 19, wherein when there is no WLL station or no mobile station in the peripheral areas in which the cells formed by the radio waves from the plurality of base stations are overlapped, a supervision station is placed at a position where the radio waves from the plurality of base stations can be received, and the supervision station measures the time difference among the frame synchronization information of the plurality of base stations, and transmits the measured information of the time difference to one of, or both of, or the plurality of base stations.

21. A mobile communication system with shared time slots and shared frequency channels comprising:
   a plurality of mobile stations such as automobile telephones and portable telephone units;
   at least one wireless local loop (WLL) station;
   a plurality of base stations; and
   at least one mobile switching center connected to said plurality of base stations,
   radio communication being performed between said mobile stations and said base stations by using time-divided code division multiple access (CDMA) signals that share time slots and frequencies with time division multiple access (TDMA) signals or share only time slots with TDMA signals, wherein
   said mobile switching center comprises:
      time slot designation means for designating time slots used by said plurality of mobile stations, the WLL station and said plurality of base stations such that a given time slot is allocated to a plurality of zones that belong to different cells of said communication system and do not overlap each other.

22. A mobile communication system with shared time slots and shared frequency channels comprising:
   a plurality of mobile stations such as automobile telephones and portable telephone units;
   at least one wireless local loop (WLL) station;
   a plurality of base stations; and
   at least one mobile switching center connected to said plurality of base stations;
   radio communication being performed between said mobile stations and said base stations by using time-divided code division multiple access (CDMA) signals that share time slots and frequencies with time division multiple access (TDMA) signals or share only time slots with TDMA signals, wherein
   said mobile switching center comprises:
      control means for controlling personal communication services (PCS) time slots and cellular time slots to be synchronized along a time line.

23. A mobile communication system as claimed in claim 22, wherein the time-divided time slot for cellular is a time-divided CDMA time slot for cellular, and the time-divided time slot for PCS is a time-divided CDMA time slot for PCS, and the mobile stations, the WLL stations, and the base stations control, under instruction of the mobile switching centers, the sharing of the time-divided CDMA time slot for cellular and the time-divided CDMA time slot for PCS in the same time-divided time slot so that a guard time of the time-divided CDMA time slot for cellular becomes longer than a guard time of the time-divided CDMA time slot for PCS.

24. A mobile communication system as claimed in claim 22, wherein the time-divided time slot for cellular is a TDMA time slot for cellular, and the time-divided time slot for PCS is a TDMA time slot for PCS, and the mobile stations, the WLL stations, and the base stations control, under instruction of the mobile switching stations, the sharing of the TDMA time slot for cellular and the TDMA time slot for PCS in the same time-divided time slot so that a guard time of the TDMA time slot for cellular is longer than a guard time of the TDMA time slot for PCS.

25. A mobile communication system as claimed in claim 22, wherein the time-divided time slot for cellular is a time-divided CDMA time slot for cellular and a TDMA time slot for cellular, and the time-divided time slot for PCS is a time-divided CDMA time slot for PCS and a TDMA time slot for PCS, and the mobile stations, the WLL stations, and the base stations control, under instruction of the mobile switching stations, the sharing of the time-divided CDMA time slot for cellular and the TDMA time slot for cellular and the time-divided CDMA time slot for PCS and the TDMA time slot for PCS in the same time-divided time slot so that a guard time of the TDMA time slot for cellular becomes longer than a guard time of the TDMA time slot for PCS.

26. A mobile communication system with shared time slots and shared frequency channels comprising:
   a plurality of mobile stations such as automobile telephones and portable telephone units;
   at least one wireless local loop (WLL) station;
   a plurality of base stations; and
   at least one mobile switching center connected to said plurality of base stations;
   radio communication being performed between said mobile stations and said base stations by using time-divided code division multiple access (CDMA) signals that share time slots and frequencies with time division multiple access (TDMA) signals or share only time slots with TDMA signals, wherein
   each of said plurality of base stations comprises:
      measuring means for measuring a first time difference between a transmission of a radio wave from that base station to one of said plurality of mobile stations, and a reception thereof;
   each of said plurality of mobile stations comprises:
      transmitting means for transmitting to a first base station a second time difference that elapses between an arrival of a first radio wave from the first base station and an arrival of a second radio wave from a second base station; and
   said mobile switching center comprises:
      time slot management means for receiving the first time difference and the second time difference, so as to determine a third time difference that should be provided by an associated one of said plurality of mobile stations between a transmission of a radio wave and a head of a frame.

27. A mobile communication system as claimed in claim 26, wherein the information of the time difference is stored in a memory in each of the plurality of mobile switching centers.

28. A synchronized multi-operator mobile communication system with shared time slots and shared frequency signals comprising:
   a plurality of mobile stations such as automobile telephones and portable telephone units;
   at least one wireless local loop (WLL) station;

a plurality of base stations belonging to respective multiple operators; and a plurality of mobile switching centers belonging to respective operators of different radio communication systems, and connected to respective ones of said plurality of base stations, radio communication being performed by using time-divided code division multiple access (CDMA) signals that share time slots and frequencies with time division multiple access (TDMA) signals or share only time slots with TDMA signals, wherein the WLL station comprises:
  monitoring means for receiving control signals from base stations belonging to different operators, so as to collect time-difference information indicating a time difference between the received control signals, and for transmitting the time-difference information to a selected one of said plurality of base stations via selected ones of said plurality of mobile switching centers; and each of said plurality of base stations comprises:
  frame synchronization recovery means for recovering frame synchronization between said plurality of base stations in accordance with the time-difference information transmitted from the WLL station.

29. A mobile communication system as claimed in claim 28, wherein when there is no WLL station or no mobile station in the peripheral areas in which the cells formed by the radio waves from the plurality of base stations are overlapped, a supervision station is placed at a position where the radio waves from the plurality of base stations can be received, and the supervision station measures the time difference among the frame synchronization information of the plurality of base stations, and transmits the measured information of the time difference to at least one of said plurality of base stations.

* * * * *